United States Patent [19]

Phillips

[11] Patent Number: 5,072,650
[45] Date of Patent: Dec. 17, 1991

[54] POWER STEERING SYSTEM WITH IMPROVED STABILITY

[75] Inventor: Edward H. Phillips, Rochester Hills, Mich.

[73] Assignee: Techco Corporation, New York, N.Y.

[21] Appl. No.: 562,478

[22] Filed: Aug. 3, 1990

[51] Int. Cl.⁵ .............................. F15B 9/00; B62D 5/00
[52] U.S. Cl. .................................. 91/375 A; 180/132; 464/97
[58] Field of Search ....................... 91/375 A; 60/384; 180/132, 141, 142, 79.1; 464/97

[56] References Cited

U.S. PATENT DOCUMENTS

| 2,772,546 | 12/1956 | Barrons | 464/97 |
| 3,608,131 | 9/1971 | Hornschuch et al. | 464/97 |
| 4,214,642 | 7/1980 | Davvergne | 180/132 |
| 4,367,672 | 1/1983 | Elser | 91/375 A |
| 4,452,041 | 6/1984 | Rau | 60/384 |
| 4,625,624 | 12/1986 | Adams | 91/375 A |

FOREIGN PATENT DOCUMENTS 3740052  6/1988  Fed. Rep. of Germany ...... 180/132

Primary Examiner—Edward K. Look
Assistant Examiner—Hoang Nguyen
Attorney, Agent, or Firm—Harness, Dickey & Pierce

[57] ABSTRACT

An improved power steering system for motor vehicles of the type used for steering dirigible wheels is disclosed. In particular, the improved system is a rotary valve equipped power steering system in which the steering wheel is coupled to the rotary control valve via a coupling device having a rotational stiffness characteristic that is less than the rotational stiffness characteristic associated with the rotary valve itself.

15 Claims, 23 Drawing Sheets

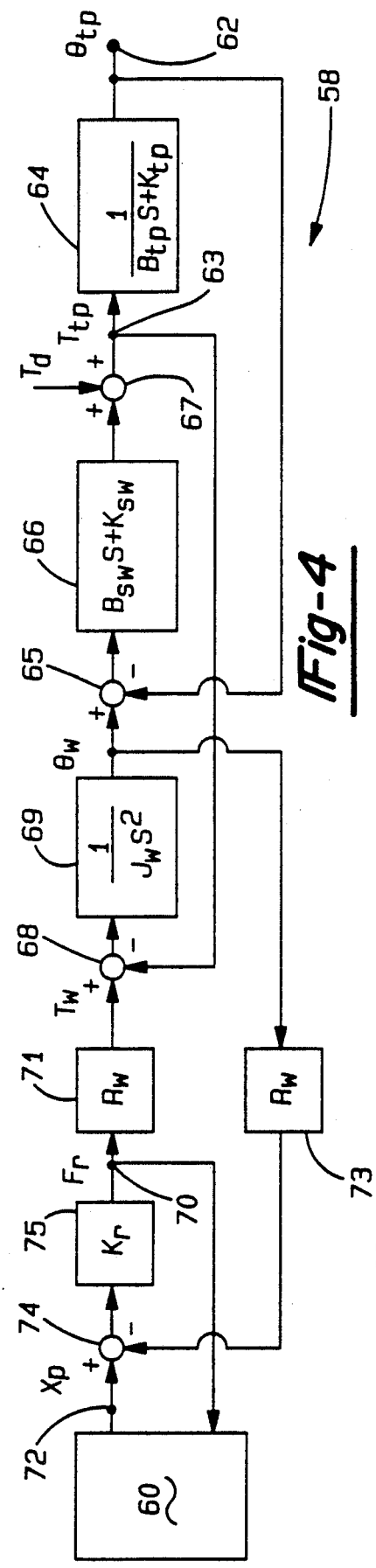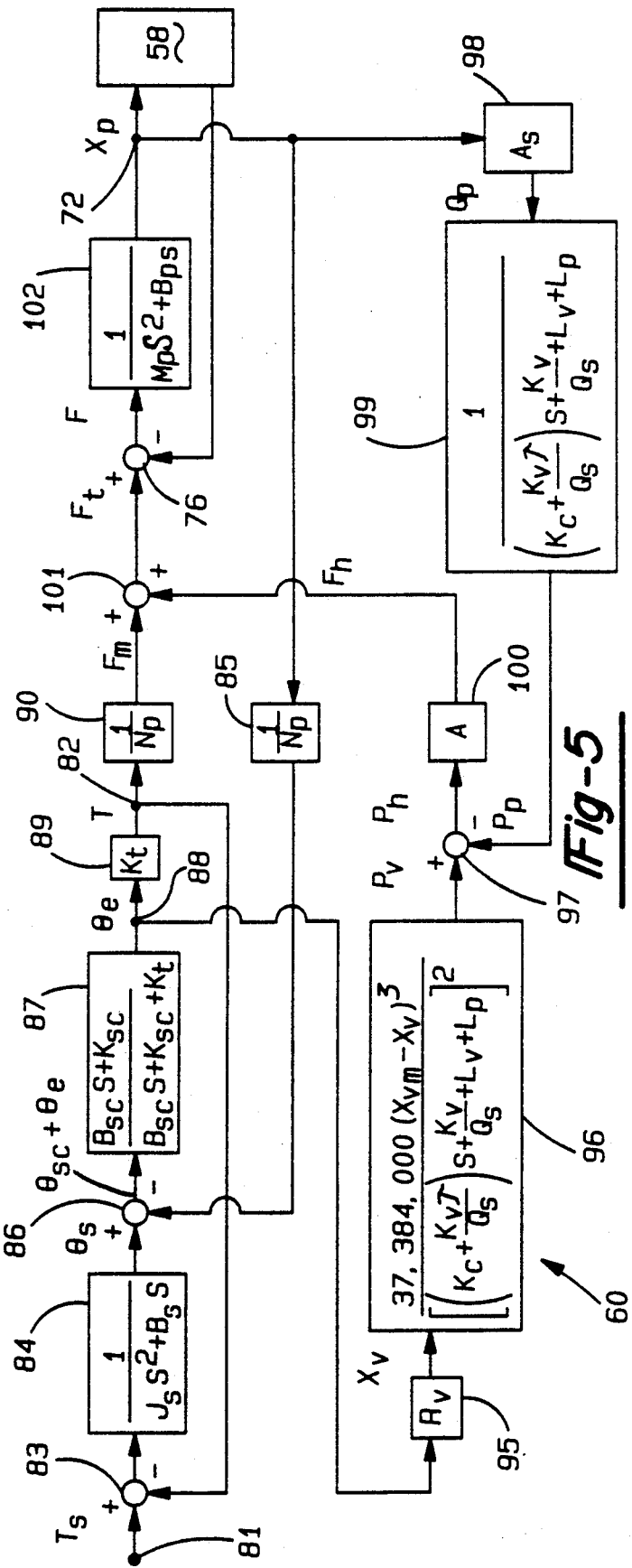
Fig-4
Fig-5

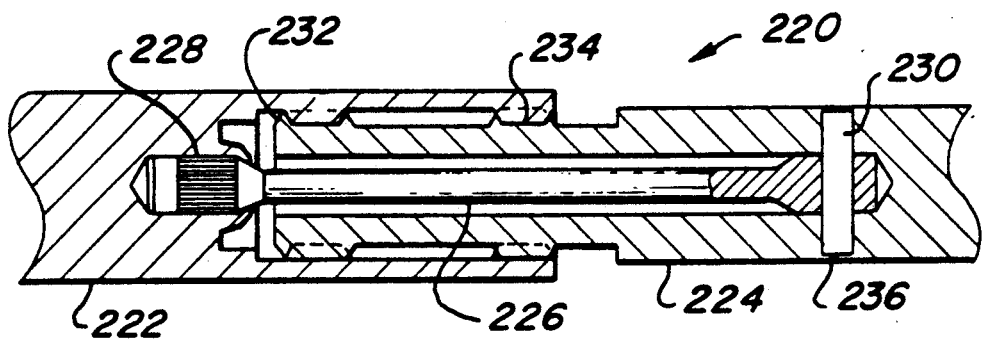
Fig-7
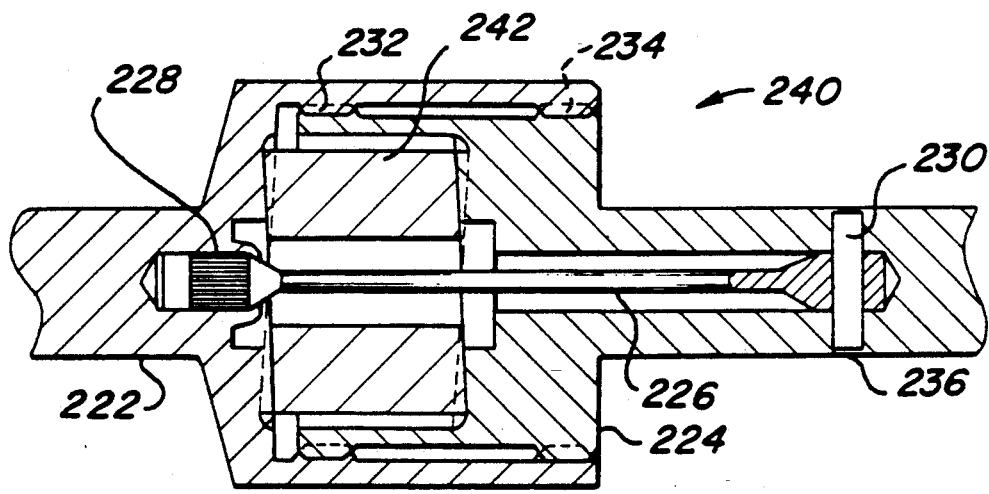
Fig-8
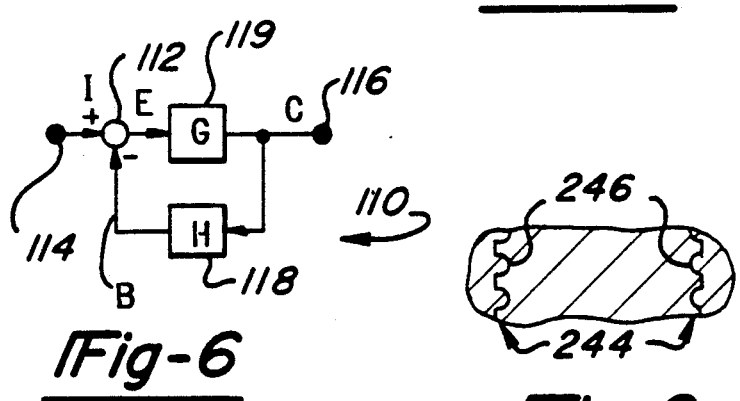
Fig-6
Fig-9

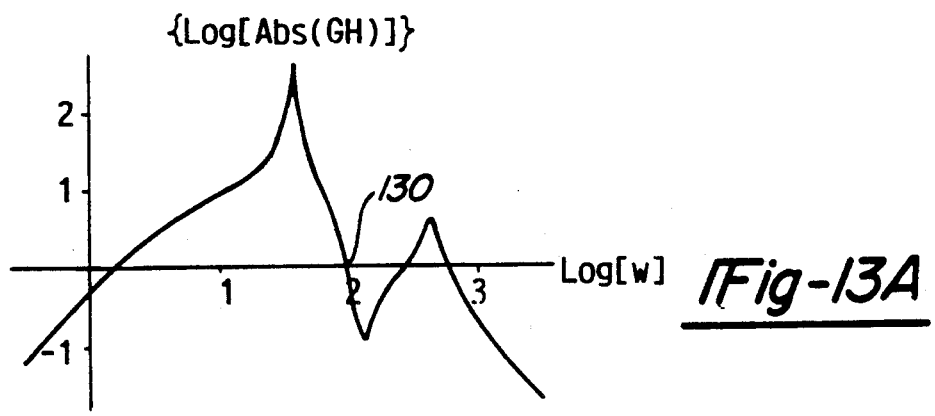
*Fig-13A*
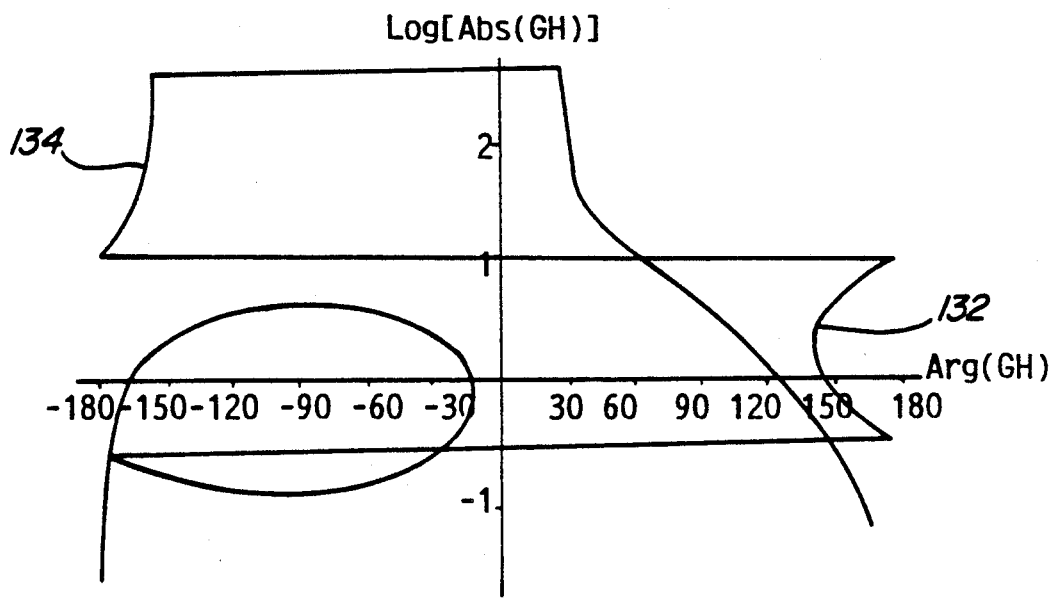
*Fig-13B*
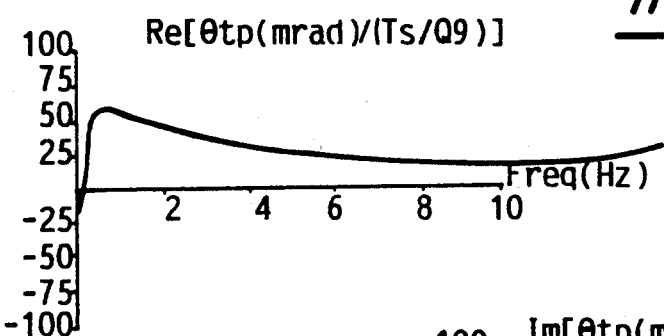
*Fig-13C*
*Fig-13D*
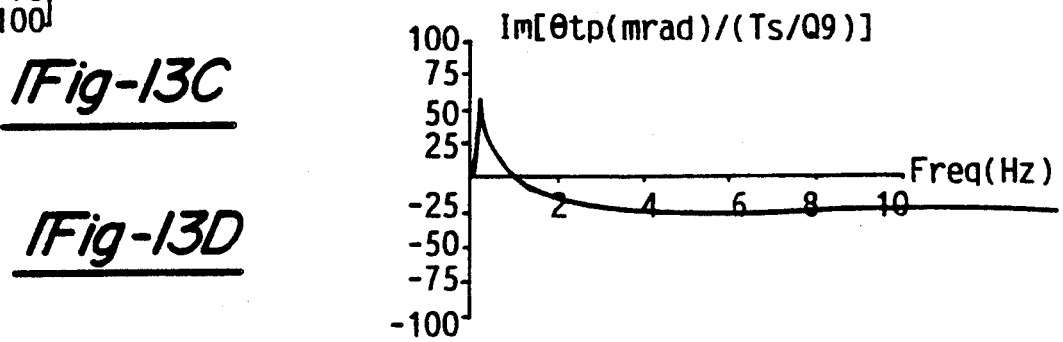

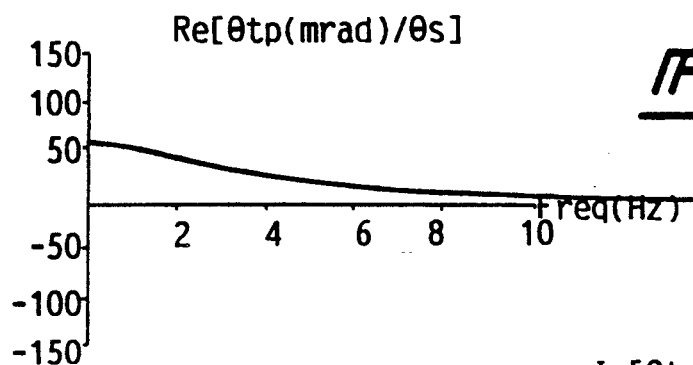
*Fig-17G*
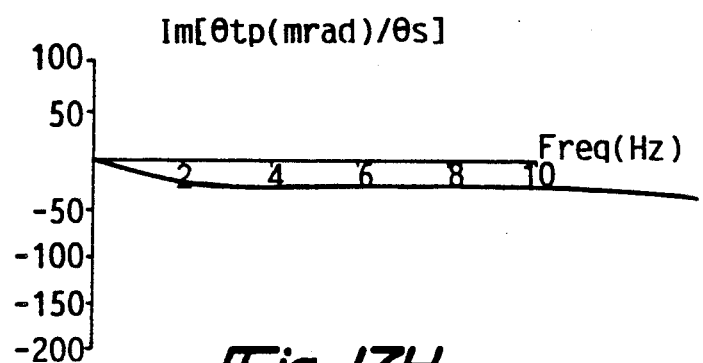
*Fig-17H*
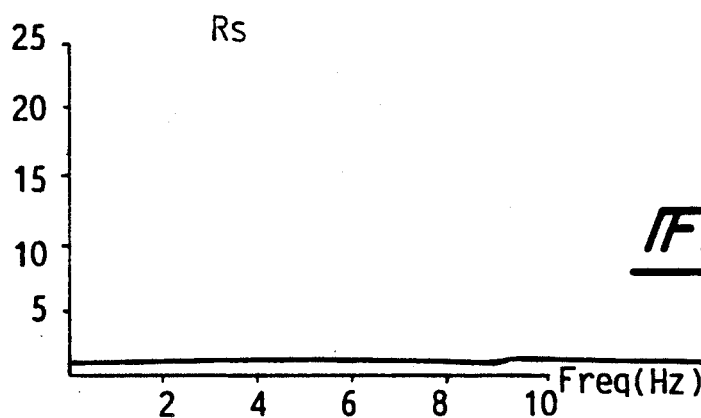
*Fig-17I*
*Fig-17J*
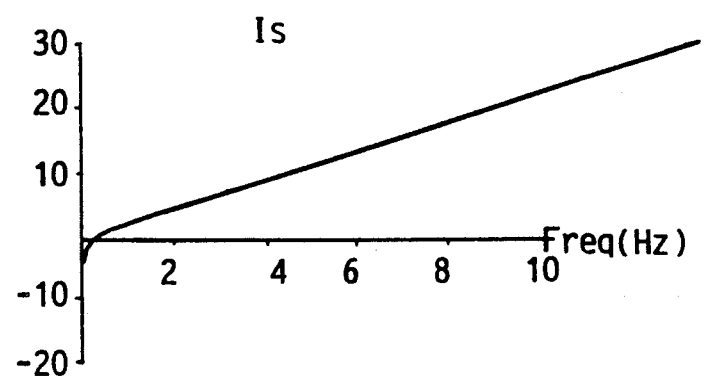

POWER STEERING SYSTEM WITH IMPROVED STABILITY

BACKGROUND AND SUMMARY OF THE INVENTION

The present invention relates generally to hydraulically actuated power steering systems utilizing rotary control valves and, more particularly, to an apparatus and method for improving system stability.

Power steering systems are used in motor vehicles to augment the steering effort applied to the steering wheel. Many conventional power steering systems employ an open-center rotary control valve (hereinafter "rotary valve") having "follow along" position feedback. In rotary valve equipped systems, "road feel" is artificially induced by deflection of a rotationally compliant torsion bar.

In general, power steering systems can be described as closed-loop servo systems wherein input signals are received from the motor vehicle upon the vehicle operator applying a steering torque to the steering wheel. Output signals are compared therewith via the above noted "follow along" position feedback. Like all functional closed-loop servo systems, power steering systems typically have open loop gain with an absolute value that is greater than 1.0 over much of their operational frequency range. Ideally, stable system operation requires unity gain cross-over with a phase lag angle of less than 180 degrees at some higher frequency. (A thorough discussion of servo system stability is contained in a book entitled FEEDBACK AND CONTROL SYSTEMS by Di Stefano III, Stubberud and Williams, and published by the McGraw-Hill Book Company as one of Schaum's Outline Series.)

Unfortunately, many conventional rotary valve equipped power steering systems do not achieve unity gain cross-over with a phase lag angle of less than 180 degrees under all operating conditions. Instead, these systems rely on Coulomb friction to attenuate resulting system oscillation. This is generally implemented with an O-ring "brake" which disrupts normal system roll-off characteristics in order to preclude system oscillation. An exemplary rotary valve constructed to include O-ring "brake" is illustrated in FIG. 2 of U.S. Pat. No. 4,452,274, entitled ROTARY VALVE FOR POWER STEERING SYSTEM, issued June 5, 1984 to Haga et al, the specification and drawings of which are expressly incorporated by reference herein. Although it is not specifically called out by reference number, the O-ring is located in a groove in steering shaft 24 to the left of port 38 in FIG. 2 of U.S. Pat. No. 4,452,274. Such O-ring mounting grooves are typically ported to incoming hydraulic fluid pressure such that the O-ring acts as a brake between the steering shaft and the valve sleeve whenever the incoming hydraulic fluid pressure is high.

Alternatively, relatively stable system operation for rotary valve equipped power steering systems has been obtained by "detuning" the system using an abnormally slow bypass flow regulation response (of their pumping systems). In effect, the slow bypass flow regulation response acts as a dominant pole for roll off open-loop gain. Such "detuning" provides a unity gain cross-over with a phase lag angle of less than 180 degrees which allows the O-ring "brake" to be eliminated.

However, the stable system operation requires that the slow response must be effective at high pressures despite the fact that bypass flow regulation response time characteristically increases with a reduction in fluid pressure. For these reasons, flow regulation response times can potentially exceed one second at low steering forces. This results in steering assist response times that are so slow that the vehicle operator may not perceive any steering assist at the low steering forces.

Accordingly, the present invention describes various embodiments of an improved rotary valve equipped power steering system which overcome the disadvantages of the prior art. More particularly, various methods of achieving "stable" unity gain cross-over are described. In a first preferred embodiment, the steering wheel is coupled to the rotary control valve via a coupling device having a rotational stiffness characteristic that is less than the rotational stiffness associated with the rotary valve itself. This results in a general decrease in the open loop gain whereby unity gain cross-over is achieved at a lower frequency with a reduced phase lag angle.

In a second preferred embodiment, the coupling device is modified to include a damping media in addition to the above noted reduced rotational stiffness. The damping media adds a zero function in the open loop gain which causes unity gain cross-over to be achieved with less phase lag angle.

In a third preferred embodiment, the power steering systems described with reference to the first and second embodiments are modified to include, constant flow rate pumping systems. Since fluid is delivered to the rotary valve at a substantially constant flow rate, substantially instantaneous pressure response is achieved. As a result, the above noted bypass flow regulation response pole is virtually eliminated whereby unity gain crossover occurs with still less phase lag angle.

Various other objects and advantages of the present invention will become more apparent to one skilled in the art from reading the following specification taken in conjunction with the appended claims and the following drawings.

BRIEF DESCRIPTION OF THE DRAWINGS

FIG. 4 is a block diagram depicting the functional characteristics of the motor vehicle's structure, wheels, tires and tire patch;

FIG. 5 is a block diagram which depicts the function of the control system associated with the improved rotary valve equipped power steering system of the present invention;

FIG. 6 is a "canonical form" of a feedback control system to which the combined block diagrams of FIGS. 4 and 5 can be reduced via computations of forward and feedback transfer functions;

FIG. 7 is a cross-sectional view of a torsionally flexible coupling device according to a first embodiment of the present invention;

FIG. 8 is a cross-sectional view of a torsionally flexible coupling device utilizing an elastomeric damping material according to a second embodiment of the present invention;

FIG. 9 depicts a rounded tooth profile utilized for providing mechanical interlocking between the shafts and the elastomeric damping material of the torsionally flexible coupling device of FIG. 8.

FIGS. 13A-J and 14A-J are graphs depicting the dynamic performance of the conventional rotary valve equipped power steering system of FIG. 1;

FIGS. 17A-J are graphs illustrating the stable dynamic performance of the rotary valve equipped power steering system according to a second embodiment of the present invention.

DETAILED DESCRIPTION OF THE PREFERRED EMBODIMENTS

Figure 1:
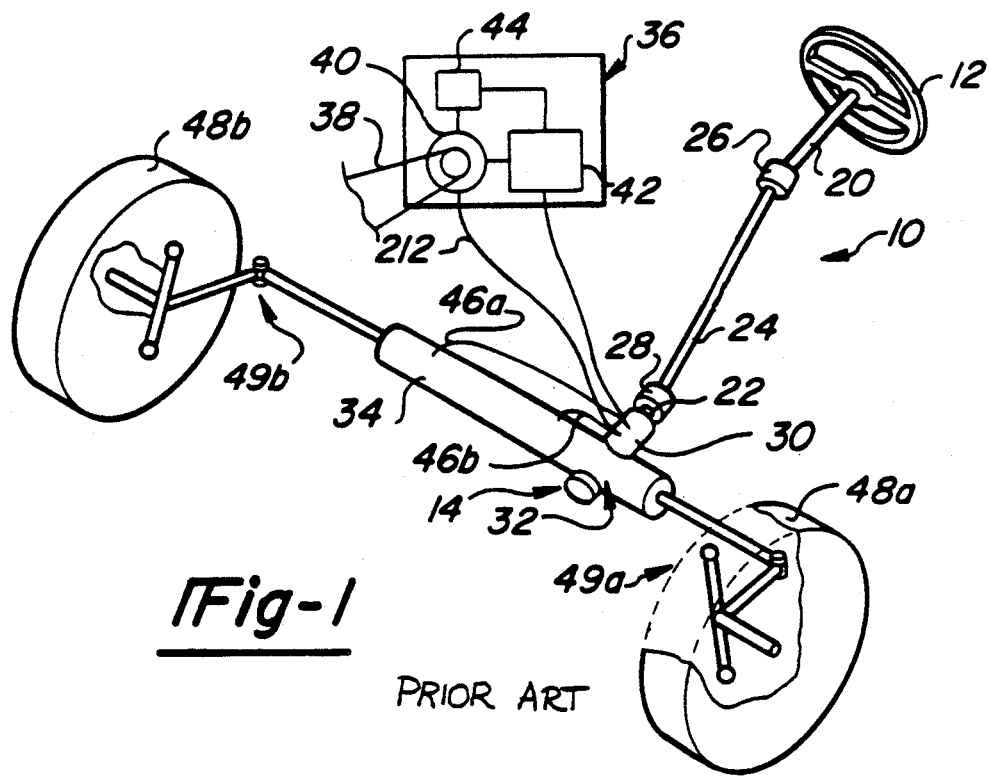
FIG. 1 is an isometric drawing illustrating the general relationship of the various components of a convention of rotary valve equipped power steering system.
Figure 2:
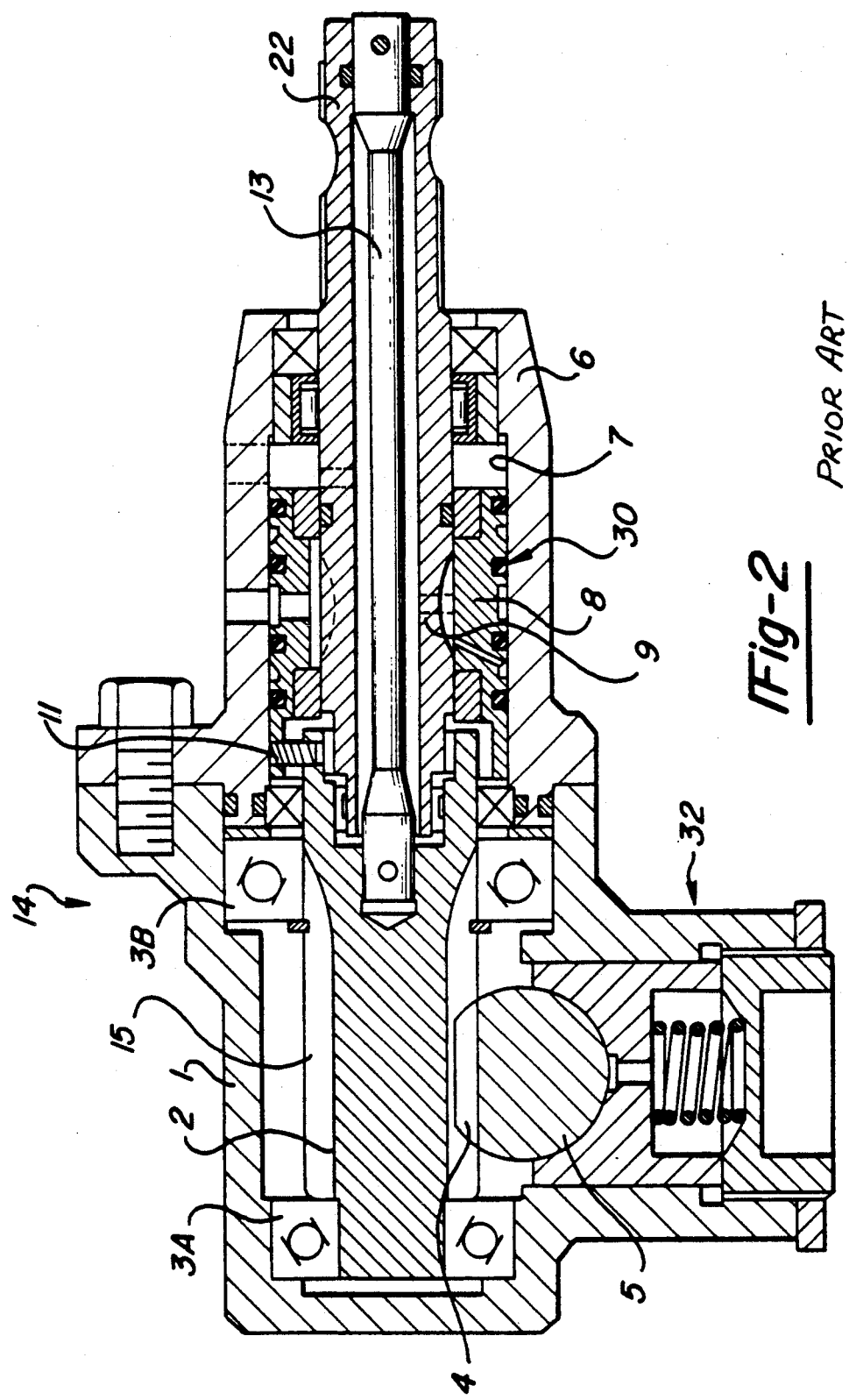
FIG. 2 is a cross-sectional view of an exemplary rotary valve.

With particular reference to FIGS. 1 and 2, a "conventional" rotary valve equipped power steering system 10 of the type used in motor vehicles is shown. In operation, the operator (i.e. driver) of the motor vehicle applies an "input" torque by selectively applying a steering torque to steering wheel 12. Typically, the "input" torque is transmitted to a steering unit 14 via shafts such as upper and lower steering shafts 20 and 24, respectively, which are interconnected using upper and lower universal joints 26 and 28, respectively. An input shaft 22 associated with a rotary valve 30 is provided for coupling steering unit 14 to universal joint 28 and, consequently, to steering wheel 12. Steering unit 14 typically includes rotary valve 30, a steering gear assembly 32 and a power cylinder 34. Power cylinder 34 is usually configured as a double-acting cylinder which is mechanically linked to steering gear assembly 32. Power cylinder 34 provides steering assist in the form of a hydraulically derived steering force. The hydraulically derived steering force augments the mechanically derived steering force produced by steering gear assembly 32 upon application of the "input" torque to input shaft 22 via the motor vehicle operator applying the steering torque to steering wheel 12.

Hydraulic fluid is supplied to rotary valve 30 at a nominally constant flow rate by a pump assembly 36. Pump assembly 36 is usually driven by the vehicle's engine (not shown) via a belt and pulley assembly 38. When pump assembly 36 is directly coupled to the engine, and further, when it includes a fixed displacement pump 40, the flow rate of output fluid flowing from fixed displacement pump 40 varies with engine speed. In this case, a portion of the output fluid flow is then selectively bypassed to a reservoir 42 by a flow regulating bypass assembly 44 and the remaining fluid flow is delivered to rotary valve 30 as its input fluid flow. (I.e., see a description of such power steering pumping systems in MARKS' HANDBOOK FOR MECHANICAL ENGINEERS published by the McGraw-Hill Book Company.)

With particular reference to FIG. 2, there is shown an exemplary rack and pinion power steering system employing rotary valve 30. Reference numeral 1 denotes a housing in which a pinion shaft 2 is rotatably received through bearings 3a and 3b mounted therein. Pinion shaft 2 is provided with a pinion gear 15 which is in mesh with a rack 4 provided on a rack shaft 5 which is slidably received in housing 1 in a nominally transverse direction to the axis of pinion shaft 2. The end portions of rack shaft 5 are suitably connected to front dirigible wheels 48a and 48b of a vehicle through steering linkage assembly 49a and 49b, respectively, in a well known manner. Rack shaft 5 is operably connected to a piston in power cylinder 34 as is conventionally known in the art.

Secured to housing 1 is a valve housing 6 provided with a valve chamber 7 in which rotary valve 30 is rotatably received. Rotary valve 30 includes a valve sleeve 8 and a rotor 9 which are rotatable with respect to each other about the axis of pinion shaft 2. Valve sleeve 8 is connected to pinion shaft 2 through a connecting pin 11 while rotor 9 is constructed in the exemplary embodiment shown as a portion of input shaft 22. Input shaft 22 is elastically connected to pinion shaft 2 through a torsionally compliant member such as torsion bar 13.

In operation, differential output fluid pressure and flow are selectively conveyed from rotary valve 30 to either end of power cylinder 34 via left and right hydraulic lines 46a and 46b, respectively, as a function of steering torque applied by the driver. In particular, steering motion and total steering force are applied to dirigible wheels 48a and 48b by steering unit 14 via tie-rod and linkage assemblies 49a and 49b. In general, the steering motion is monitored within rotary valve 30 via coupling rotor 9 to input shaft 22 and a valve sleeve 8 to pinion shaft 2 of steering gear assembly 32. "Follow along" position feedback is realized upon relative displacement between steering gear assembly 32 and input shaft 22 for regulating the conveyance of differential output fluid pressure and flow from rotary valve 30 to either end of power cylinder 34 via left and right hydraulic lines 46a and 46b, respectively. It will be appreciated the "conventional" rotary valve equipped power steering system of FIGS. 1 and 2 is merely exemplary and is not intended to limit the scope of the instant invention.

Figure 3:
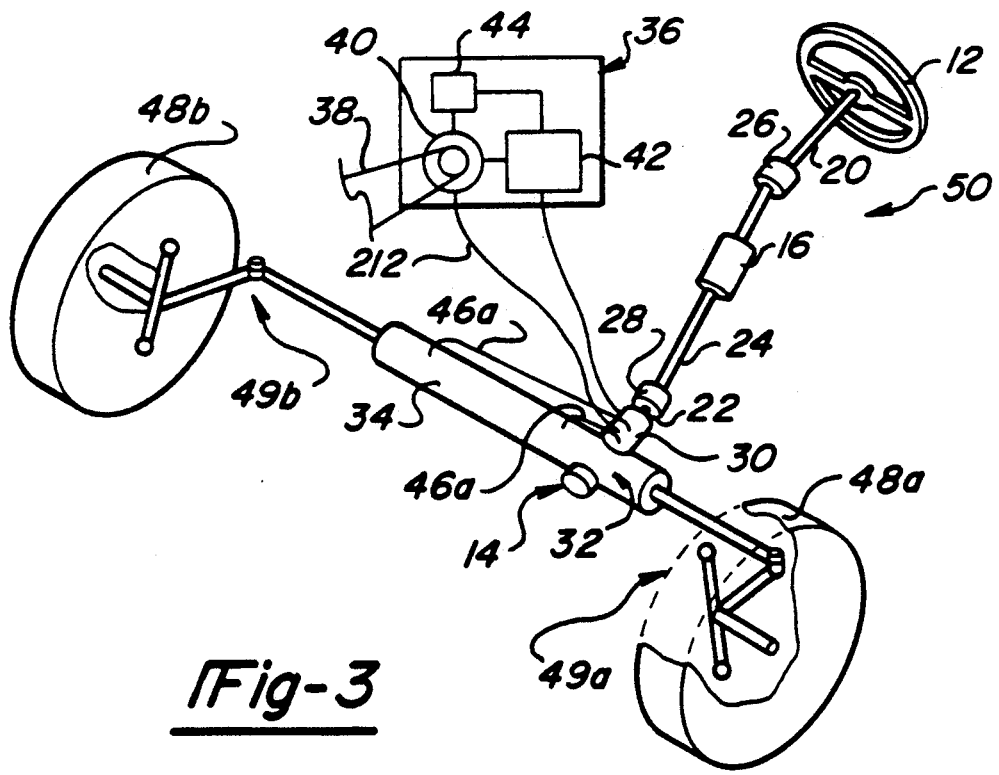
FIG. 3 is an isometric drawing, similar to FIG. 1, depicting an improved rotary valve equipped power steering system utilizing a coupling having less rotational stiffness than the rotational stiffness characteristic of the rotary valve.

With particular reference now to FIG. 3, an improved power steering system 50 is shown which includes many of the same components herebefore described in reference to FIG. 1. As such, like reference numerals will be used to identify like components. In particular, steering wheel 12 is coupled to rotary valve 30 via a coupling device 16. Steering torque is transmitted through coupling device 16 via a rotationally compliant member, to be described hereinafter in greater detail, which has less rotational stiffness than that associated with torsion bar 13 of rotary valve 30. Coupling device 16 is shown disposed within lower steering shaft 24 between upper and lower universal joints, 26 and 28, respectively.

Although coupling device 16 is shown coupled between upper and lower universal joints 26 and 28, respectively, it could alternately be disposed within either of upper steering shaft 20 or input shaft 22 as well, functionally, the principle of the present invention is to complimentary "decouple" steering wheel 12 from rotor 9. However, it is also important that all elements disposed between coupling 16 and rotor 9 function in a substantially linear manner. Specifically, if upper and lower universal joints 26 and 28, respectively, are operationally subject to Coulomb friction induced non-linearities, coupling 16 should be located beyond lower universal joint 28 (i.e., it should be disposed within input shaft 22).

With reference now to FIGS. 4 and 5, block diagrams 58 and 60 enable detailed mathematical analyses of power steering systems equipped with rotary valve 30. Block diagram 58 depicts the operational characteristics of the host vehicle's structure, wheels, tires and tire patch wherein tire patch characteristics comprise:

$$K_{tp} = 15,000 \ e^{-1.5X_p} \text{ and}$$

$$B_{tp} \approx 250 + 500X_p + 875X_p^2,$$

where $K_{tp}$ is an exemplary torsional stiffness between the interface between the tire patch and a roadway, $X_p$ is piston/rack assembly and tie rod/linkage assembly input motion at rack 5, and $B_{tp}$ is an exemplary torsional damping coefficient derived from energy loss associated with torsional movement of the tire patch.

The output signal of a steering system as a whole determines the average steering angle achieved at the host vehicle's tire patches, $\theta_{tp}$, which is located in block diagram 58 at output terminal 62. $\theta_{tp}$ is determined by the sum of the torques applied to the tire patches, $T_{tp}$ (located at terminal 63), multiplied by control element $1/(B_{tp}s + K_{tp})$ (where $B_{tp}$ and $K_{tp}$ are the exemplary torsional stiffness and damping coefficient terms defined above, and s is the LaPlace variable) shown at block 64. $T_{tp}$ is determined by the difference between average dirigible wheel angle, $\theta_w$, and $\theta_{tp}$ (which difference is achieved via summing point 65) multiplied by control element $(B_{sw}s + K_{sw})$ (where $B_{sw}$ is a torsional damping coefficient derived from energy loss associated with torsional deflection of the tire patch with respect to the dirigible wheels 48a and 48b and $K_{sw}$ is a torsional stiffness associated with torsional deflection of the tire patch with respect to the dirigible wheels 48a and 48b shown at block 66 plus any disturbing torque $T_d$ (as shown at summing point 67). $\theta_w$ is determined by the difference between the sum of the torques applied to the dirigible wheels 48a and 48b, $T_w$, and $T_{tp}$ (which difference is achieved via summing point 68), multiplied by control element $1/(J_w s^2)$ (where $J_w$ is the moment of inertia of the dirigible wheels 48a and 48b, and supporting assembly therefor) shown at block 69. $T_w$ is determined by the sum of the forces applied to an effective steering linkage radius, $F_r$ (located at terminal 70), multiplied by a control element $R_w$ (where $R_w$ is the effective steering linkage radius) shown at block 71. $F_r$ is determined by the difference between $X_p$ (located at terminal 72) and $\theta_w$ multiplied by another control element $R_w$ shown at block 73 (which difference is achieved via summing point 74), multiplied by control element $K_r$ (where $K_r$ is the overall transverse stiffness of the host vehicle's structure—including the tie rod linkage assemblies 49a and 49b) shown at block 75.

Referring to FIG. 5, block diagram 60 provides a detailed depiction of operational characteristics of the control portions of power steering systems utilizing rotary valve 30 whose principle function is to determine $X_p$. This cannot be done independently from the elements described above with respect to block diagram 58. This is because $F_r$ is fed back from terminal 70 to a position located within block diagram 60 at summing point 76.

Inputs to block diagram 60 are made at input terminal 81 by applying steering torque, $T_s$, to steering wheel 12. Torque present at input shaft 22 (and shown here at terminal 82), T, is subtracted therefrom (which subtraction is performed by summing point 83). The product of $(T_s - T)$ and control element $1/(J_s s^2 + B_s)$ (where $J_s$ is the moment of inertia of steering wheel 12 and portions of upper steering shaft 20 and/or intermediate steering shaft 24 dynamically linked thereto and $B_s$ is a torsional damping coefficient associated with energy loss associated with rotational motion of upper steering shaft 20) shown at block 84 determines steering wheel angle $\theta_s$. The product of $X_p$ and control element $1/N_p$ (where $N_p$ is the pitch radius of pinion gear 15 shown at block 85 determines rotational position feedback angle $\theta_f$. The difference between $\theta_s$ and $\theta_f$, which difference is generated by summing point 86, generates the sum of a steering shaft twist angle $\theta_{sc}$ and a system input error angle $\theta_e$. The product of $(\theta_{sc} + \theta_e)$ and control element $(B_{sc}s + K_{sc})/(B_{sc}s + K_{sc} + K_t)$ (where $B_{sc}$ is a torsional damping coefficient derived from energy loss associated with torsional deflection of coupling device 16, $K_{sc}$ is the torsional stiffness of upper steering shaft 20, intermediate steering shaft 24, upper and lower universal joints 26 and 28, respectively, and the rotationally compliant member of coupling device 16, and $K_t$ is the torsional stiffness of torsion bar 13 shown at block 87 generates the system input error angle $\theta_e$ at terminal 88 (which comprises a twist angle of torsion bar 13. The product of $\theta_e$ and control element $K_t$ shown at block 89 provides the torque T at terminal 82.

Mechanically derived steering force, $F_m$, is provided by the product of T and control element $1/N_p$ shown at block 90. "Hydraulically" derived steering force, $F_h$, is provided via the difference of a product of $\theta_e$ and a first string of control elements, and $X_p$ and a second string of control elements as follows: $\theta_e$ is multiplied by control element $R_v$ (where $R_v$ is the working radius of juxtaposed rotor 9 and valve sleeve 8) shown at block 95 to generate tangential valve motion $X_v$. $X_v$ is multiplied by control element $37,400,000(X_{vm} - X_v)^3/[(K_c + K_v \tau/Q_s)s + K_v/Q_s + L_v + L_p]^2$ (where $X_{vm}$ is maximum tangential motion between the first and second valve members, $K_c$ is cylinder fluid capacitance as determined by the volume of the power cylinder 34 divided by 4 times the effective bulk modulus, $K_v = 2C_d^2 A_o^2/\rho$ where $C_d$ is valve orifice discharge coefficient, $A_o$ is effective valve orifice area for any particular value of $\theta_e$ and $\rho$ is mass density of the fluid utilized, $\tau$ is pumping system time constant, $Q_s$ is nominal fluid supply rate, $L_v$ is valve leakage conductance and $L_p$ is cylinder leakage conductance) shown at block 96 to generate valve output pressure, $P_v$, as it would be obtained if $X_p$ was invariant (i.e., $X_p s \rightarrow 0.0$) which is positively applied to the summing point 97.

The product of $X_p$ and control element As (where A is the area of the piston in power cylinder 34 and s is the LaPlace variable) shown at block 98 determines cylinder flow rate $Q_p$. The product of $Q_p$ and control element $1/[(K_c+K_v\tau/Q_s)s+K_v/Q_s+L_v+L_p]$ shown at block 99 determines piston pressure, $P_p$, as it would be obtained if $X_v$ had a zero value (i.e., no torque applied to rotary valve 30) but the value of $K_v$ was still determined by $2C_d{}^2A_o{}^2/p$ and $P_p$ is negatively applied to summing point 97. Output hydraulic pressure, $P_h = P_v - P_p$, is obtained from summing point 97 and the product of $P_h$ and control element A shown at block 100 generates "hydraulically" derived steering force $F_h$. $F_h$ is summed with $F_m$ at summing point 101 to generate "total" steering force $F_t$. $F_r$ is subtracted from F at summing point 76 to generate net steering force F. And finally, F multiplied by control element $1/(M_ps^2+B_ps)$ (where $M_p$ is the mass associated dynamically with a rack located within steering unit 14 (i.e., such as comprised in rack shaft 5 of rotary valve 30 shown in FIG. 2) and $B_p$ is a damping coefficient associated with energy loss concomitant with non-zero values of $X_ps$) shown at block 102 generates $X_p$.

With reference now to FIG. 6, there is shown a "canonical form" block diagram 110. Block diagrams 58 and 60 can be reduced to this format via computation of suitable forward and feedback transfer functions G and H, respectively. In block diagram 110 an input signal, I, is positively applied to summing point 112 via an input terminal 114. Closed-loop response of block diagram 110 yields an output signal, C, at output terminal 116. C multiplied by control element H shown at block 118 generates a feedback signal, B, which is negatively applied to the summing point 112. B is subtracted from I at the summing point 112 to generate an error signal, E. Finally, E multiplied by control element G shown at block 119 generates the output signal C.

It is desirable for any power steering system, as represented by block diagram 110, to operate in a stable manner. This will occur if the absolute value of an open-loop transfer function comprising the product GH goes through the value 1 with the absolute value of its argument being less 180 degrees. If this is true then disturbing signal inputs to the system will be damped out and the system's operation will be stable.

Two forms of open-loop transfer function can be defined with respect to block diagram 110. A first open-loop transfer function, GH, relates $X_p$ to $T_s$. A second open-loop transfer function, GoHo, relates $X_p$ to $\theta_s$. It is of interest to plot these functions with respect to frequency and phase angle in order to judge system stability. Because low frequency values differ widely between these two functions, it is also of interest to plot real and imaginary parts of ratios of tire patch rotation $\theta_{tp}$ to $T_s$, and tire patch rotation $\theta_{tp}$ to $\theta_s$, respectively. (In the case of $T_s$, it is also helpful to multiply by a normalizing function such as a control element $Q_9 = J_s{}^2 + B_s s$.)

Detailed analysis and plotting of these functions (and others to be described hereinbelow) is greatly aided by utilizing computer analysis techniques. Such analysis has been performed herein with an analysis program entitled MATHEMATICA (available from Wolfram Research, Inc. of Champaign, Ill.). Shown below are first and second programs for plotting various performance curves for power steering systems utilizing rotary valve 30. The first and second programs shown below utilize typical values for the various terms defined above for power steering systems having a nominal value of $\tau$ (the pumping system time constant). In these programs lower case letters and no subscripts are used. Thus, js is understood to represent $J_s$ and so on. The first program is used to plot output (steering) force ft ($F_t$) as functions of input torque ts ($T_s$), input error angle thetae ($\theta_e$) and steering wheel angle thetas ($\theta_s$) and as shown herein by curves 120 and 121, 122 and 123, and 124 and 125, respectively in FIGS. 6A, 6B and 6C, respectively. It is defined as follows:

```
xvm = 0.0275 (* 0.0165 *);
kt = 590.0 (0.0275/xvm) ^ 2;
np = 0.333333;
rv − 0.4;
qs = 7.0;
a = 1.0;
thetaemax = 0.06(* 0.03 *);
tsmax = kt thetaemax;
fm[thetae_]:= kt thetae/np;
lv = 9.994;
lp = 9.991;
xv[thetae_]:= rv thetae;
kv[thetae_]:= 9346000.0 (xvm − xv[thetae]) ^ 4;
lt = lv + lp;
qss[thetae_]:= ((kv[thetae] ^ 2 + 4 qs kv[thetae]lt) ^ 0.5 −
 kv[thetae])/(2 lt);
fh[thetae_]:= 0.107 10 ^ −6 qss[thetae] 2 a/(0.0275 −
 xv[thetae]) ^ 4;
ft[thetae_]:= fm[thetae] + fh[thetae];
ts[thetae_]:= kt thetae;
ksc = 3200.0 (* 300.0 *);
thetas[thetae_]= (ksc + kt thetae/ksc);
``` where (*_*) indicates alternate values used for power steering systems comprised in preferred embodiments of the present invention.

Prior to a comparative analysis of the static and dynamic characteristics of conventional power steering systems with respect to improved systems of the present invention, various structural embodiment of coupling device 16 will be described. A first embodiment is shown in FIG. 7 wherein a shaft coupling device 220 is depicted. A first shaft 222 and a second shaft 224 are connected via a rotationally compliant torsion bar 226. Torsion bar 226 is affixed to first shaft 222 via an interference fit formed in a known manner as depicted at 228. Torsion bar 226 is secured to second shaft 224 by pin 230 also in a known manner.

Fail-safe mechanical operation of shaft coupling 220 is assured by utilizing loose fitting spline joints 232 and 234 both formed in a known manner. Utilizing loose fitting spline joints 232 and 234 enables the above-noted fail-safe mechanical operation because it precludes bending shaft coupling 220 in yaw or pitch directions in addition to the roll direction protection that would be provided by either loose fitting spine joints 232 and 234 alone. During assembly, a sub-assembly comprising first shaft 222 and torsion bar 226 is inserted into second shaft 224 with nominal centering of loose fitting spline joints 232 and 234. Then a hole 236 is formed through second shaft 224 and torsion bar 226 to accept pin 230 and, finally, pin 230 is inserted to complete the assembly of flexible shaft coupling 220.

A second embodiment of coupling device 16 is shown in FIG. 8 wherein an elastomeric damping material is utilized to provide rotational flexibility and damping in a damped shaft coupling device 240. Damped shaft coupling 240 is generally configured similarly to shaft coupling 220. However, the geometry of the various parts is slightly modified to accept a generally cylindrical bushing 242 which is utilized to elastically couple first and second shafts 222 and 224, respectively. Bushing 242 is formed from an elastomeric damping material that provides both torsional stiffness and damping for damped shaft coupling device 240.

In most elastomeric damping materials, both the elastic and damping characteristics are highly temperature dependent. This makes the selection of a suitable material critical. One material having relatively constant elastic and damping characteristics is a vulcanized polyolefinic thermoplastic rubber known as D-1110 which is available from the EAR Division of the Cabot Corporation of Indianapolis, Ind. However, D-1110 has a relatively low loss tangent of about 0.06 at normal environmental temperatures. This means that the torsional stiffness of torsion bar 226 must be significantly reduced such that most of the torsional stiffness of damped shaft coupling 240 utilizing D-1110 is provided by bushing 242.

The D-1110 elastomeric damping material is preferably adhesively bonded to first and second shafts 222 and 224, respectively. In addition, it is desirable to provide mechanical interlocking between bushing 242 and either of first and second shafts 222 and 224, respectively, as depicted by a face gear profile 244 as shown in FIG. 9. Face gear profile 244 features a rounded tooth profile as shown at 246 to minimize stress concentrations in the D-1110 elastomeric damping material.

One method of minimizing instability problems is to shift the pole created by $\tau$ toward or even beyond unity gain crossover frequency via reducing the value thereof. Thus, the unity gain crossover phase angle value is increased via pushing the pole to a frequency where its phase angle contribution is less troublesome. Such small values of $\tau$ can be generated by utilizing pumping systems that do not require active flow regulation. One method of so doing is to replace fixed displacement pump 40 in pump assembly 36 with a variable displacement pump 176 whose displacement is varied inversely with respect to the speed of the vehicle's engine. Then the product of the engine speed and the pump displacement is constant whereby fluid is delivered at a constant flow rate. Once can readily envisage all sorts of electronically or mechanically actuated methods of accomplishing this and no attempt to catalog them is made herein. One preferred method of achieving such constant flow from variable displacement pump 176 is via measuring flow therefrom and utilizing that measurement to control the displacement of variable displacement pump 176.

Figure 10:
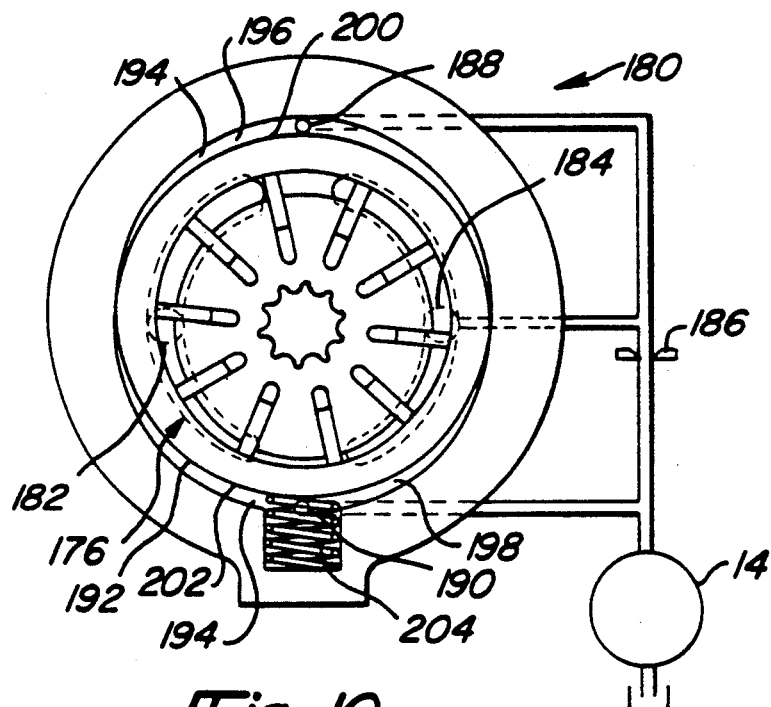
FIG. 10 is a cross-sectional view of a variable displacement pump adapted to achieve a shortened value of bypass flow regulation response time.

One such implementation is shown in FIG. 10 wherein a pump assembly 180 that utilizes variable displacement pump 176 is depicted. Variable displacement pump 176 utilized in pump assembly 180 is a variable displacement vane type pump. Fluid enters the pump via entrance port 182 and leaves as pumped fluid via pressure port 184. On its way to rotary valve 30, the pumped fluid is diagrammatically shown to flow through an orifice 186 whereby a differential pressure is generated between first and second flow measurement ports 188 and 190, respectively. The displacement of variable displacement pump 176 is regulated by transverse positioning of its cam ring 192 within an oblong chamber 194. First and second flow measurement ports 188 and 190 are hydraulically in communication with first and second end chambers 196 and 198, respectively, of oblong chamber 194. The differential pressure generated between first and second flow measurement ports 188 and 190, respectively, acts differentially on first and second edge surfaces 200 and 202, respectively, of cam ring 192 to exert a transverse force which is opposed by a spring 204.

In operation, the force exerted by spring 204 balances the differential pressure multiplied by the projected area of either of first and second edge surfaces 200 and 202, respectively. As engine speed changes, any resulting change in flow rate causes the differential pressure to change with the result that cam ring 192 moves transversely such that the flow rate is altered and spring 204 continues to balance the differential pressure times the area of either of the first and second edge surfaces 200 and 202, respectively. Even though the method of flow measurement is substantially the same as that utilized by the flow regulating by-pass assembly 44, a negligible time constant is generated thereby because regulation is primarily a function of engine speed rather than system pressure.

Figure 11:
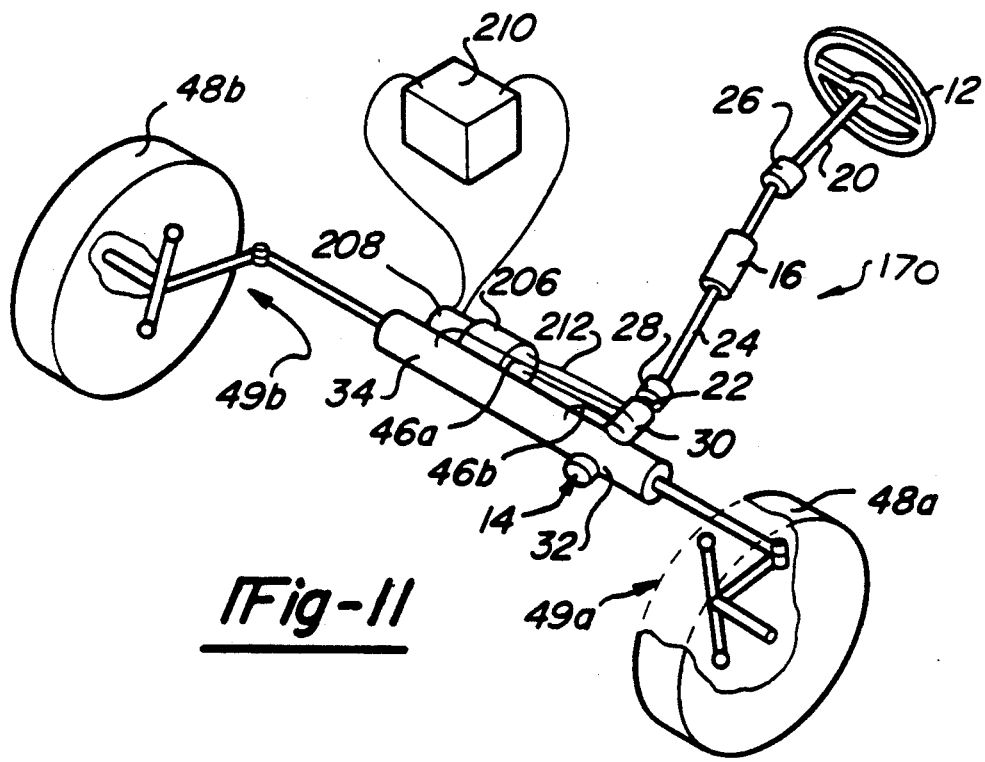
FIG. 11 is an isometric drawing showing the general relationship of the various components of the improved rotary valve equipped power steering systems additionally including an electric motor driven, fixed displacement pump.

Another method of pumping fluid that does not require active flow regulation utilizes a fixed displacement pump 206 driven by an electric motor 208 as shown in FIG. 11. Electric motor 208 is a substantially constant speed type of motor, such as a shunt wound DC motor, which draws current from a low impedance source such as host vehicle's battery 210. Use of either pump assembly 180 or fixed displacement pump 206 requires a fluid delivery line 212 having low volumetric compliance in order to actually achieve low values for $\tau$ as required in rotary valve equipped power steering system 170. One preferred method of utilizing fixed displacement pump 206 is to mount it in juxtaposition to rotary valve 30 and power cylinder 34, as depicted in FIG. 13, so that the fluid delivery line 212 can be short in length and be formed from non-compliant tubing.

Figure 12A:
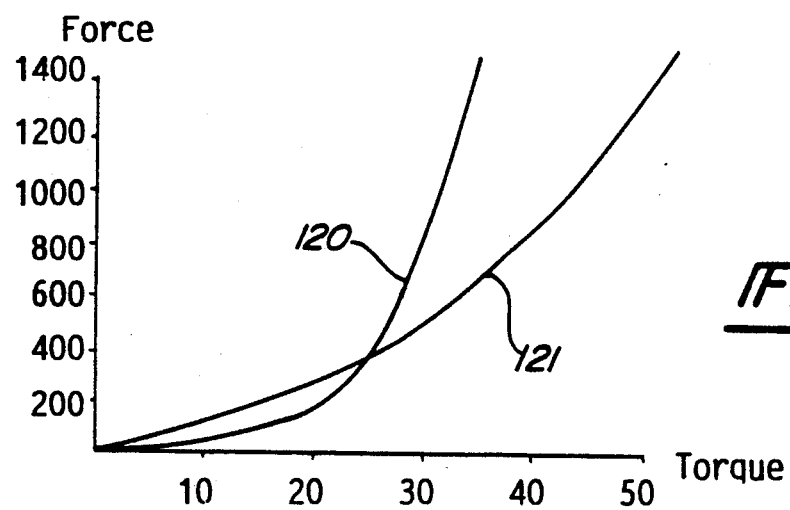
FIGS. 12A, 12B and 12C are graphical illustrations comparing static performance characteristics of the conventional rotary valve equipped power steering system (FIG. 1) with the improved power steering system according to the various preferred embodiments of the present invention.
Figure 12B:
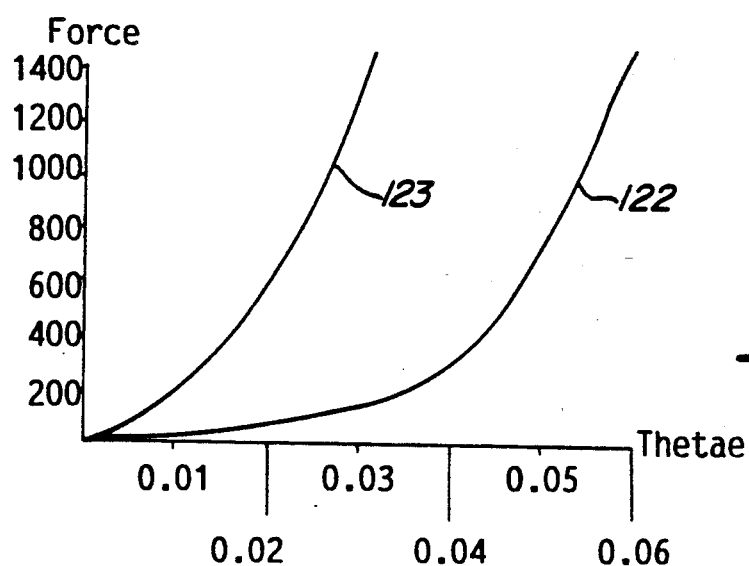
Figure 12C:
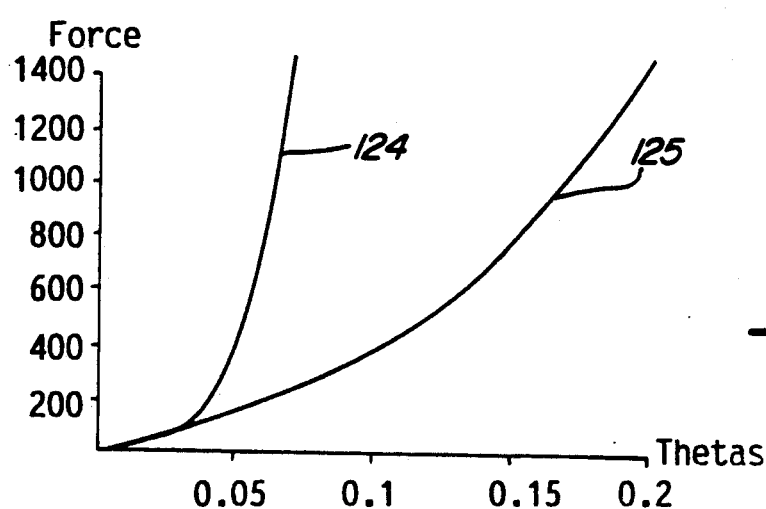
Figure 13E:
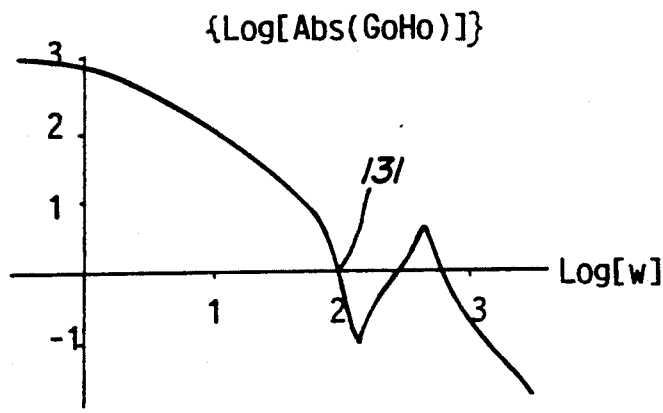
Figure 13F:
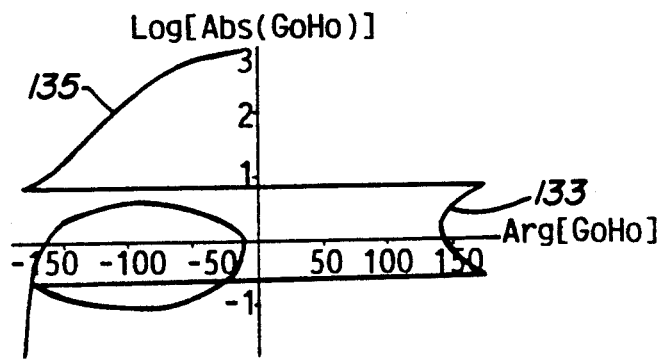
Figure 13G:
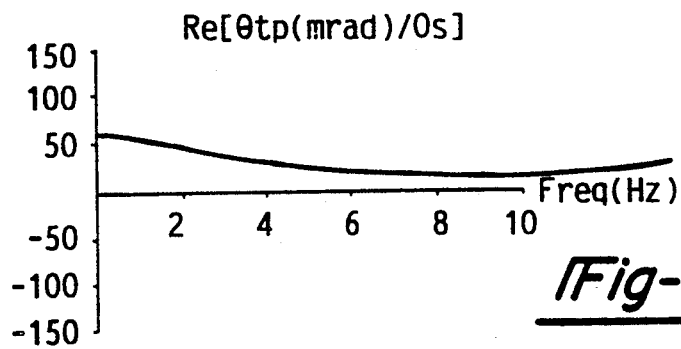
Figure 13H:
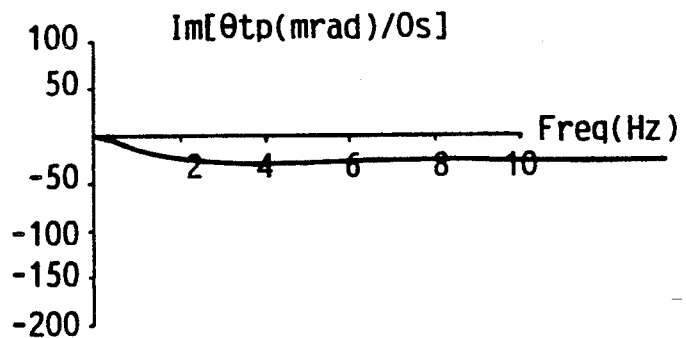
Figure 13I:
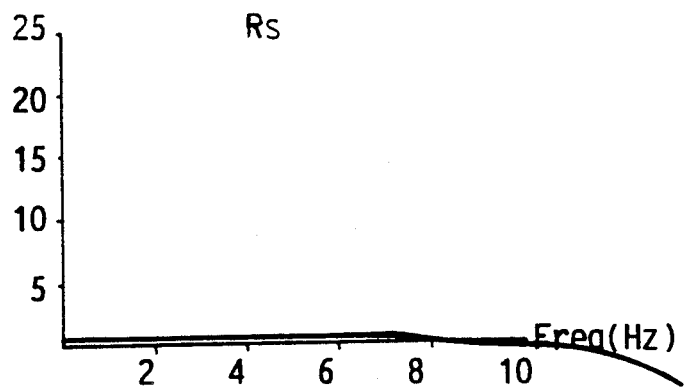
Figure 13J:
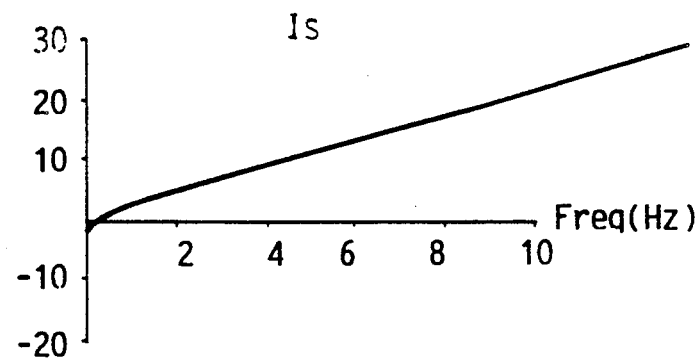
Figure 14A:
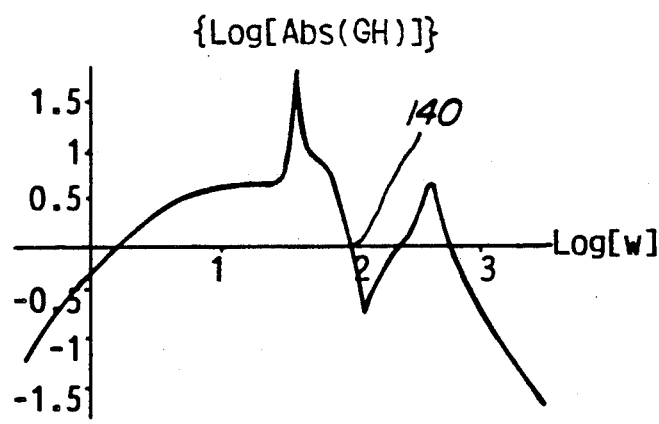
Figure 14B:
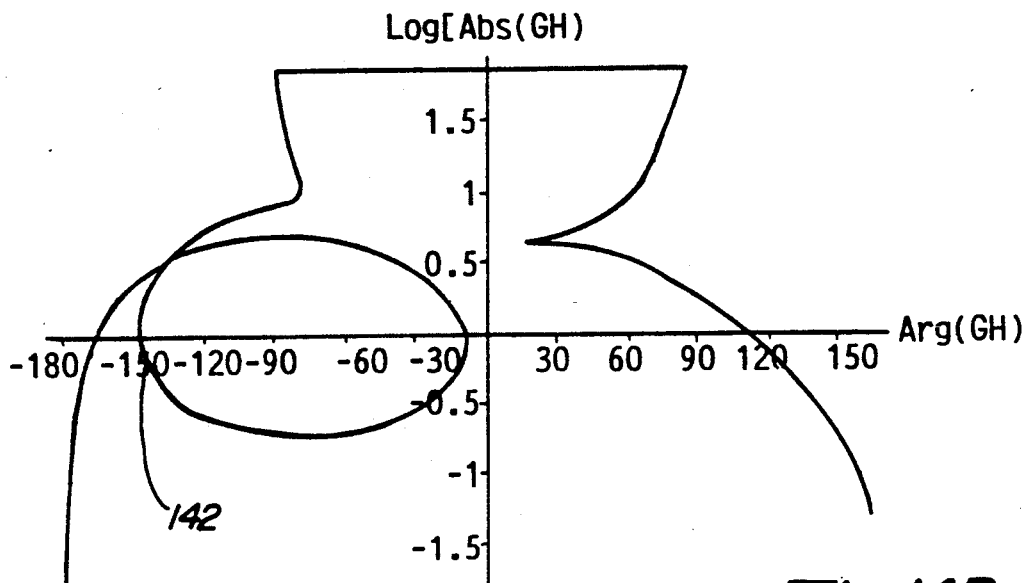
Figure 14C:
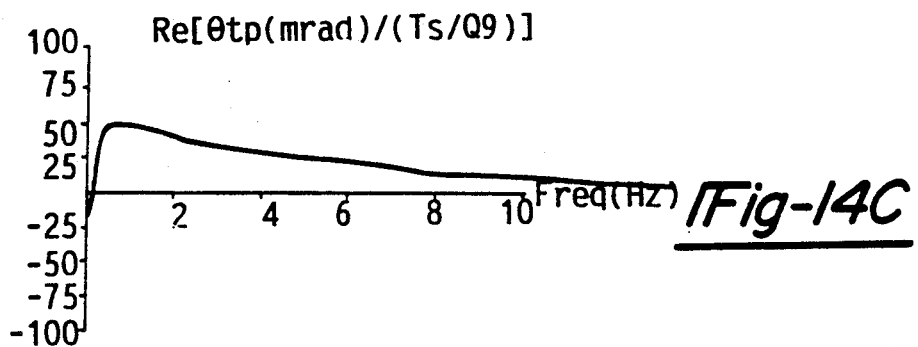
Figure 14D:
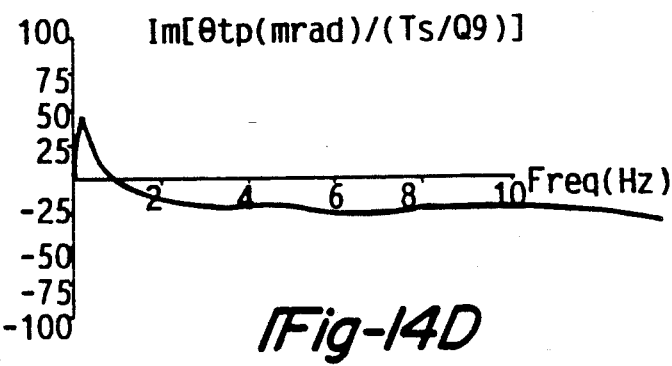
Figure 14E:
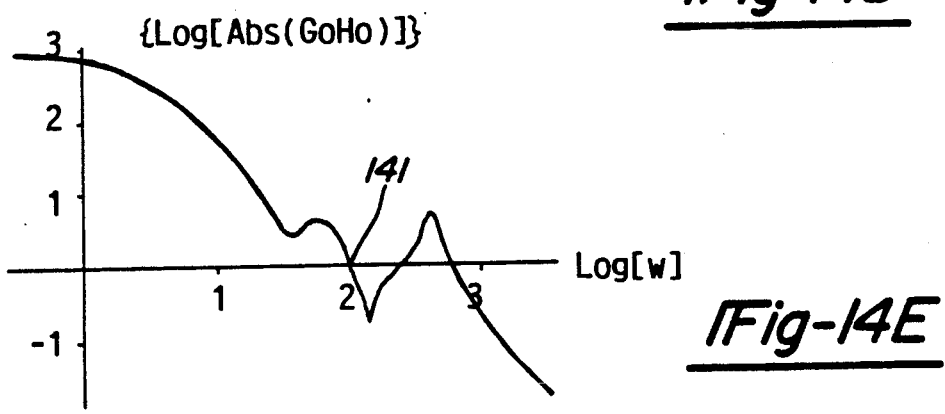
Figure 14F:
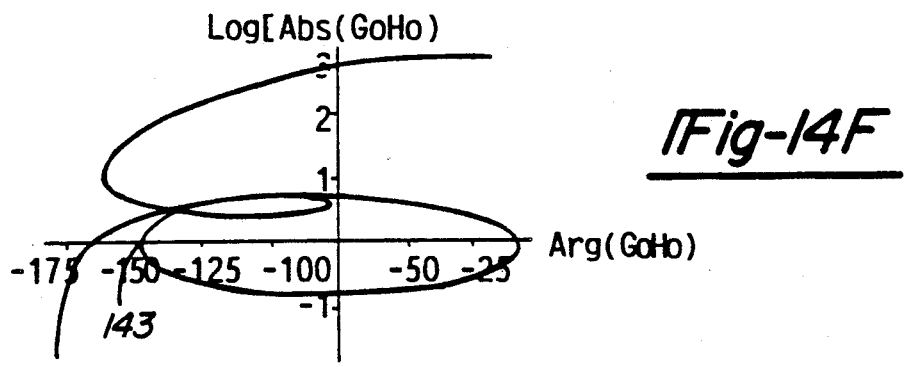
Figure 14G:
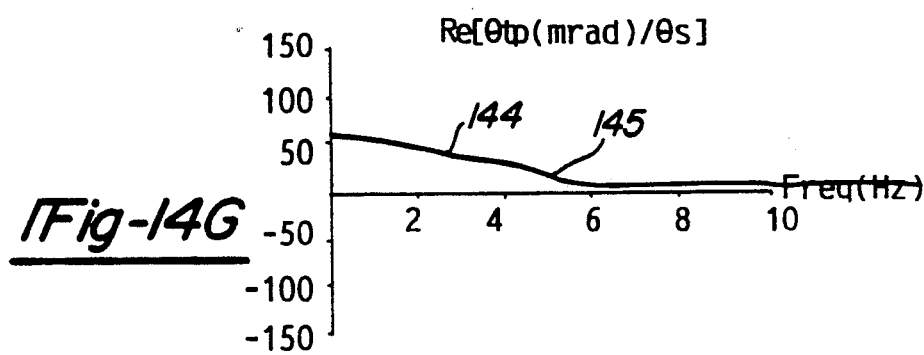
Figure 14H:
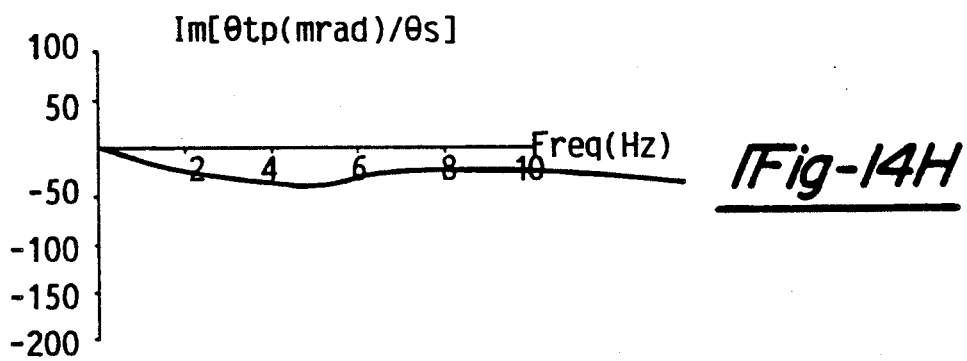
Figure 14I:
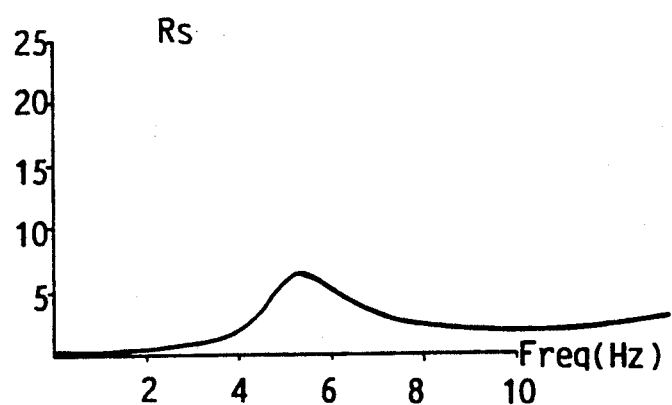
Figure 14J:
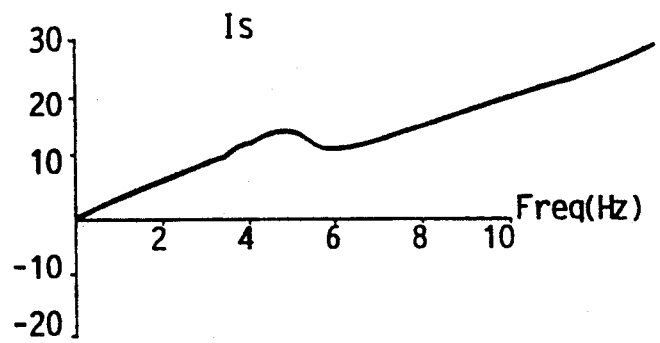
Figure 15A:
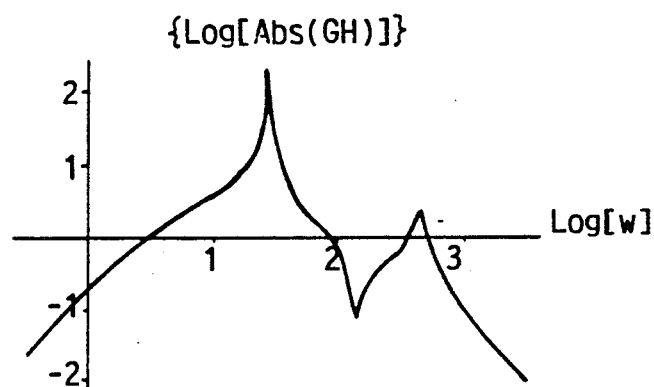
FIGS. 15A-J and 16A-J are graphs depicting the dynamic performance of the improved rotary valve equipped power steering system according to the first embodiment of the present invention.
Figure 15B:
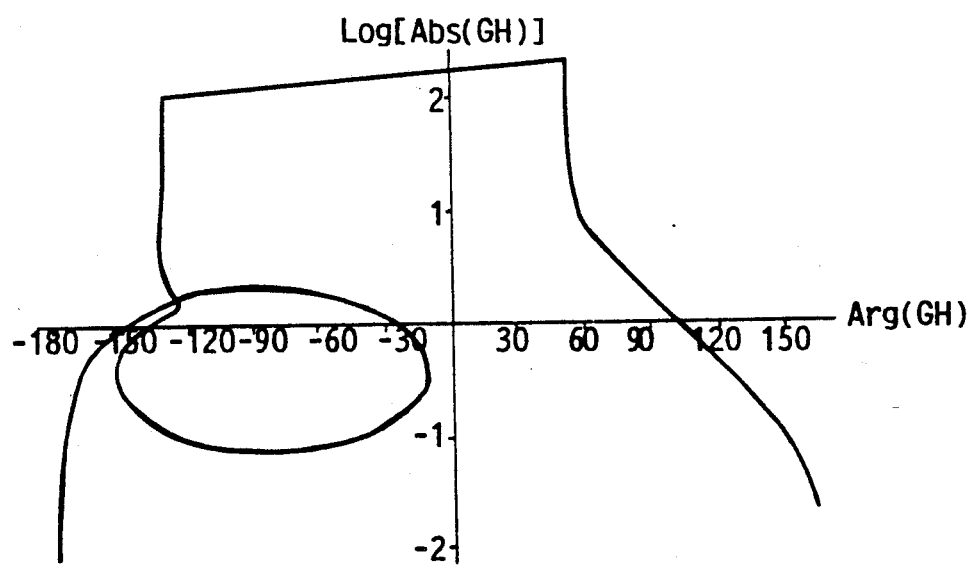
Figure 15C:
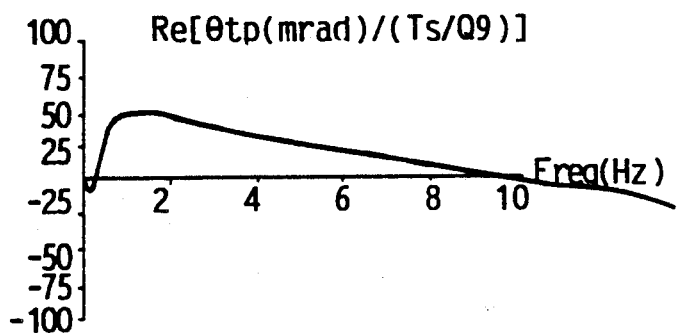
Figure 15D:
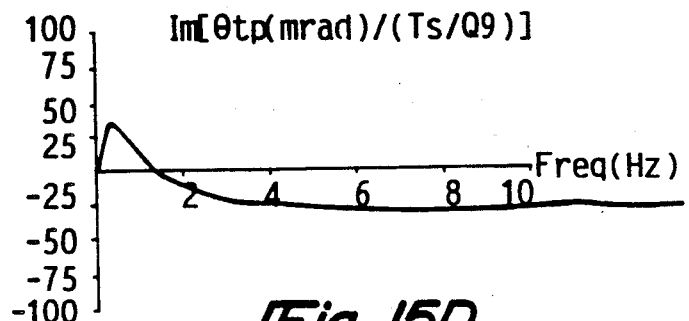
Figure 15E:
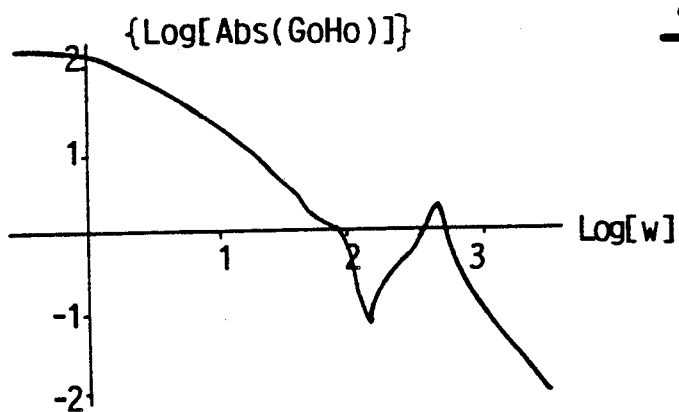
Figure 15F:
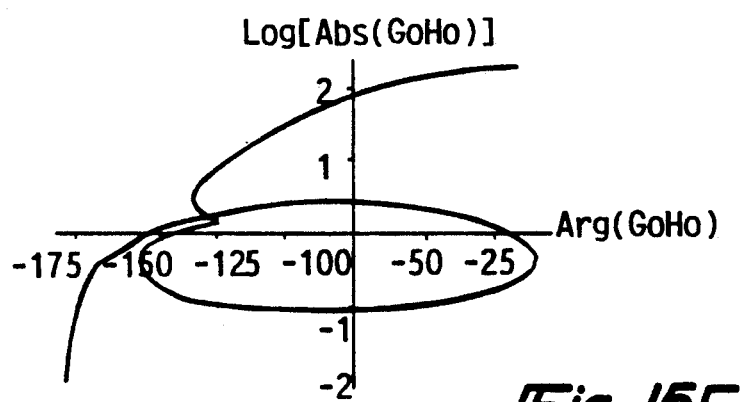
Figure 15G:
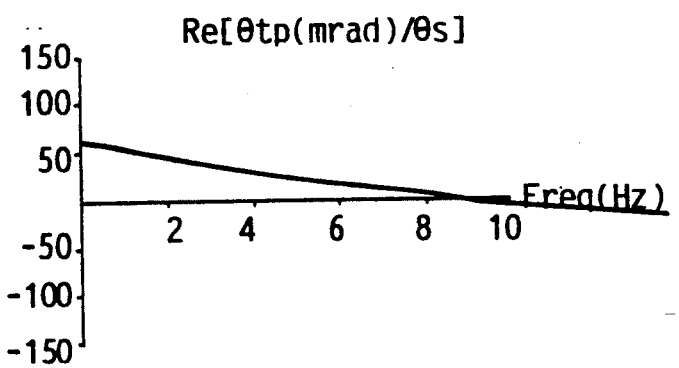
Figure 15H:
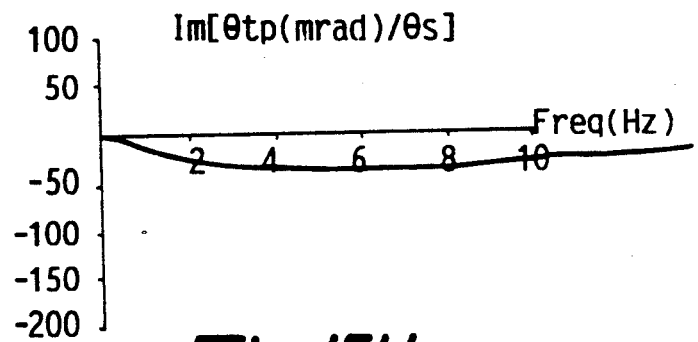
Figure 15I:
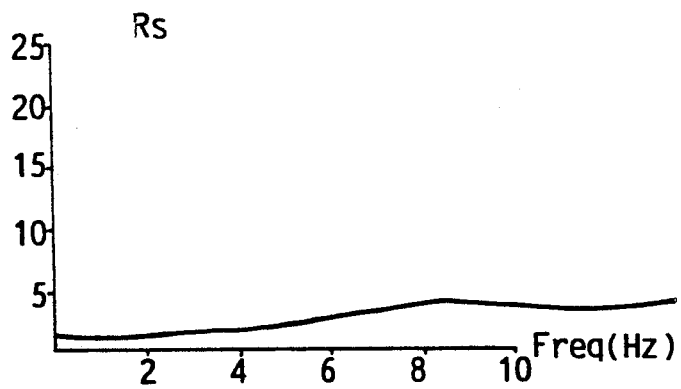
Figure 15J:
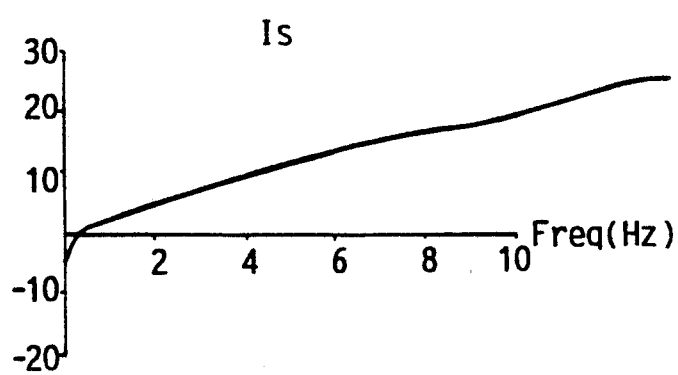
Figure 16A:
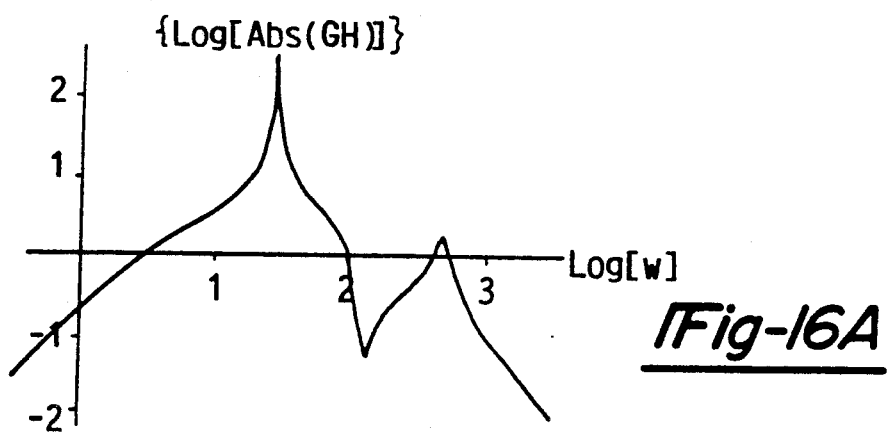
Figure 16B:
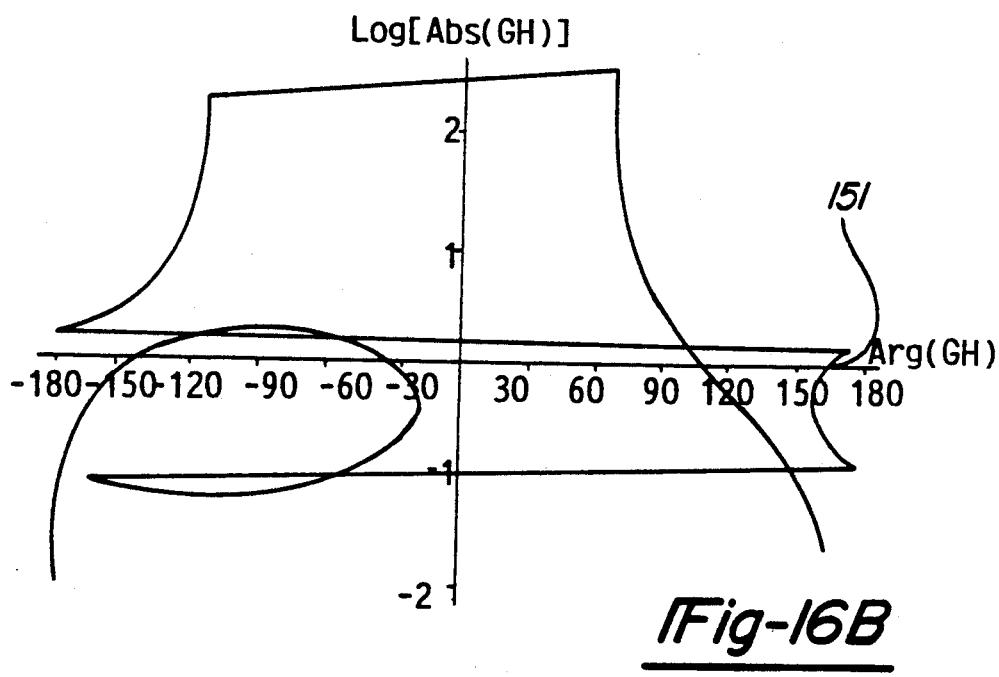
Figure 16C:
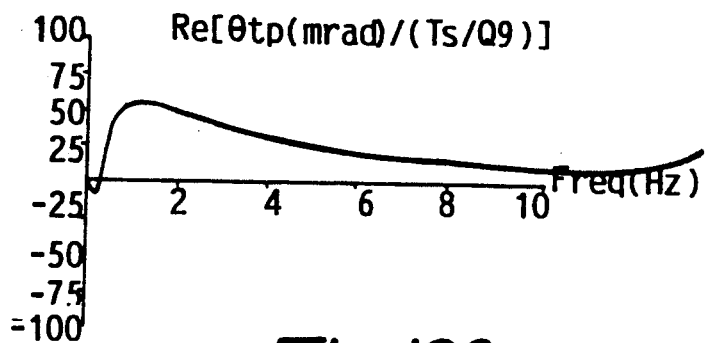
Figure 16D:
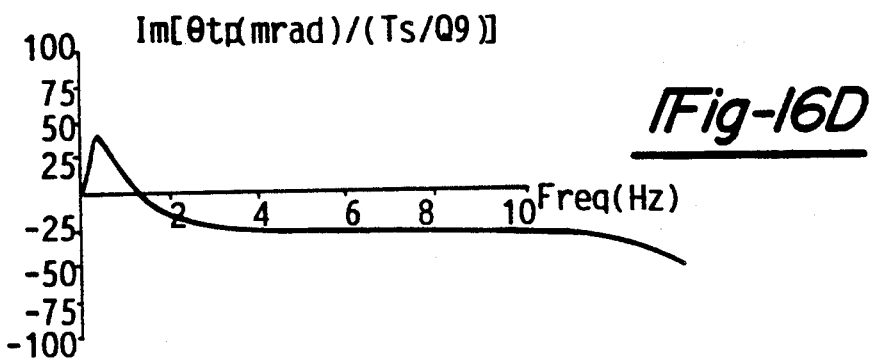
Figure 16E:
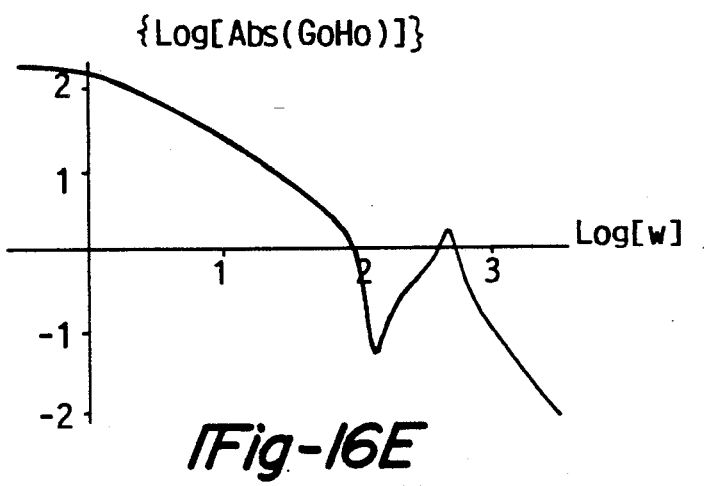
Figure 16F:
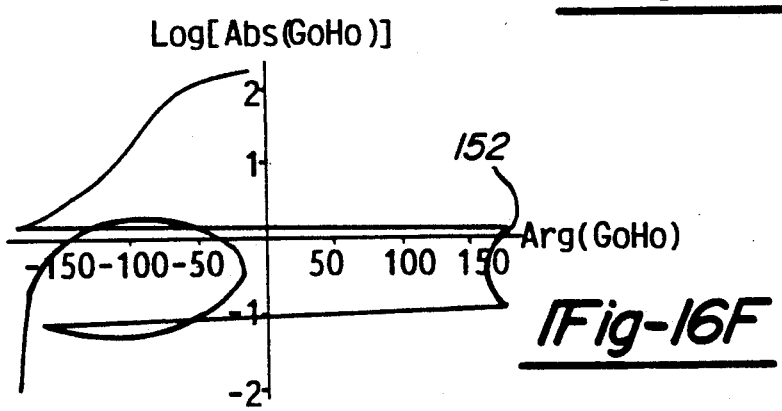
Figure 16G:
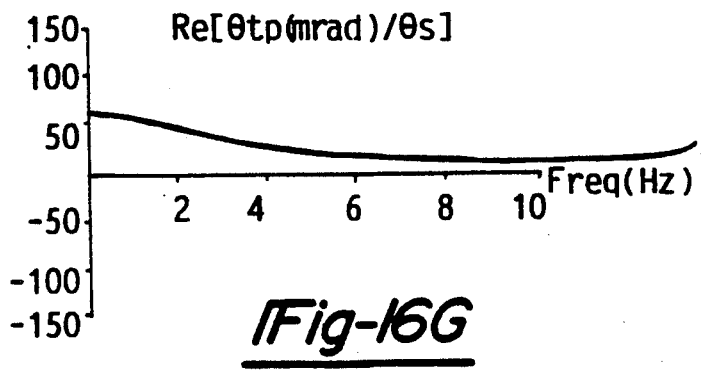
Figure 16H:
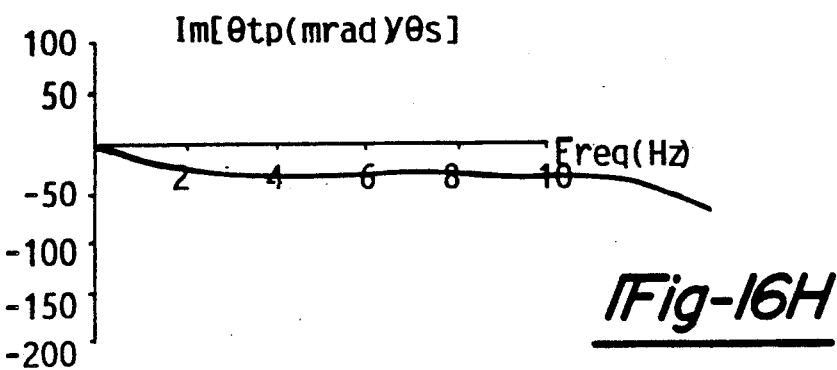
Figure 16I:
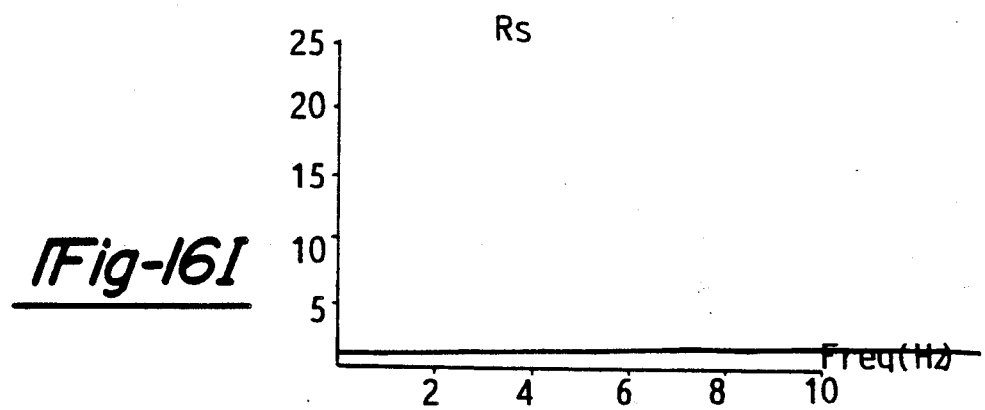
Figure 16J:
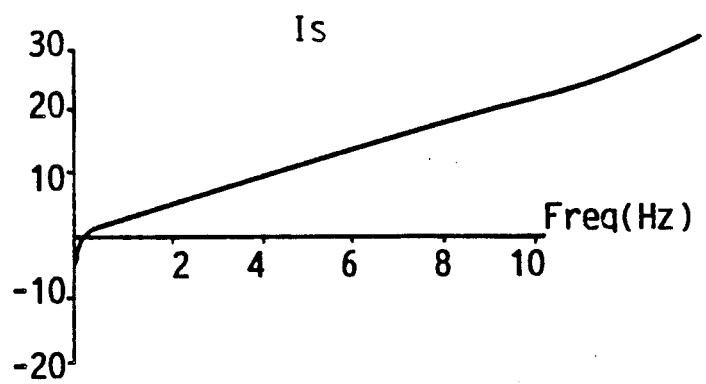
Figure 17A:
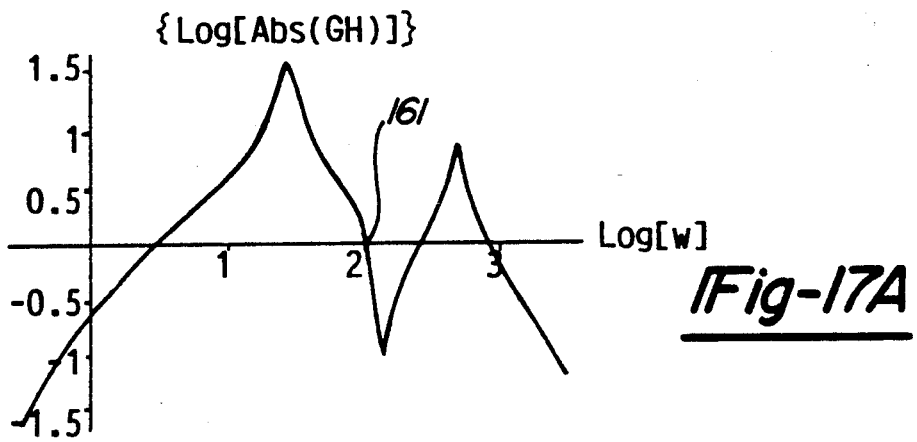
Figure 17B:
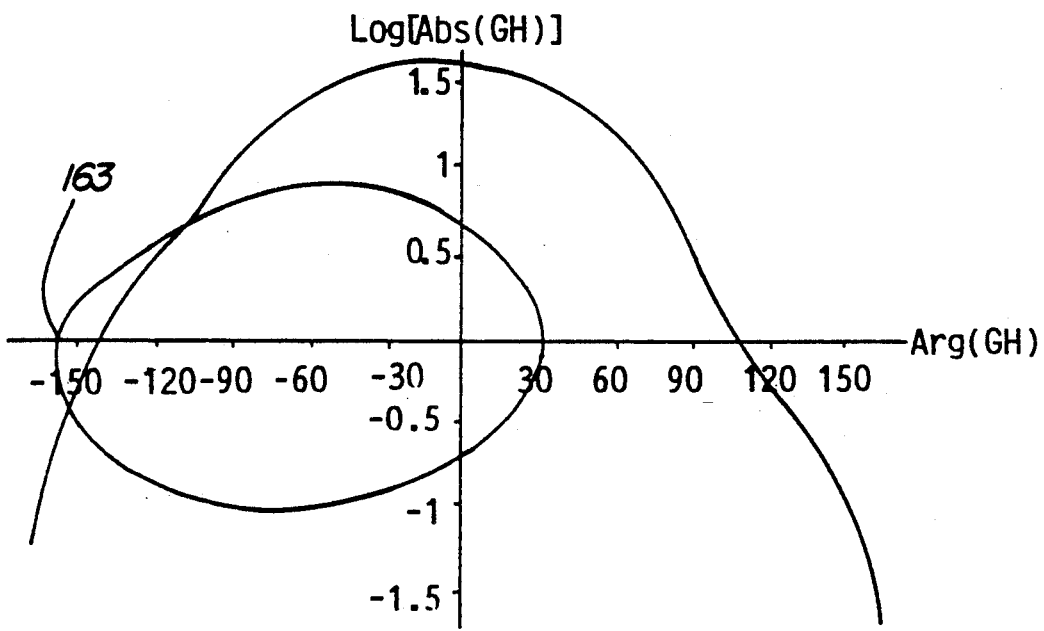
Figure 17C:
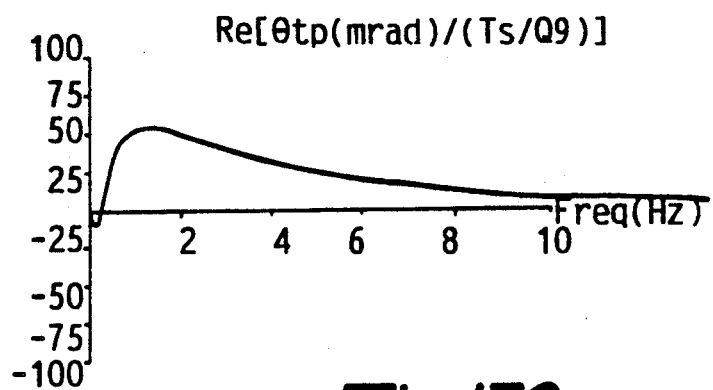
Figure 17D:
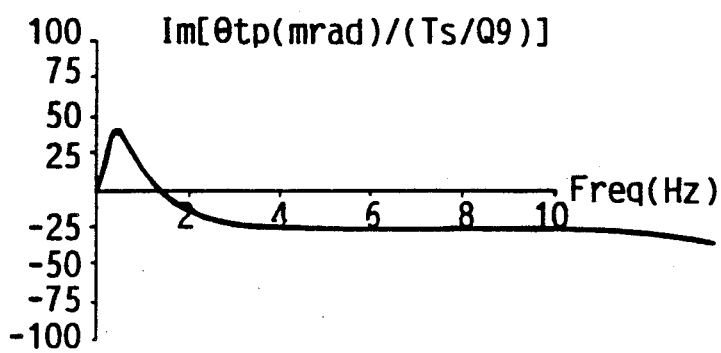
Figure 17E:
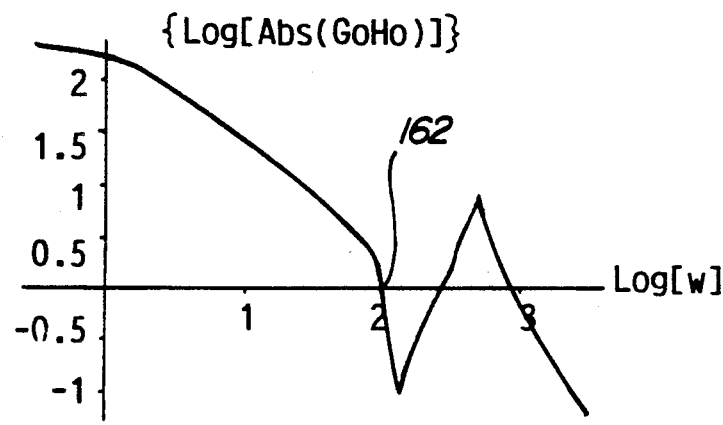
Figure 17F:
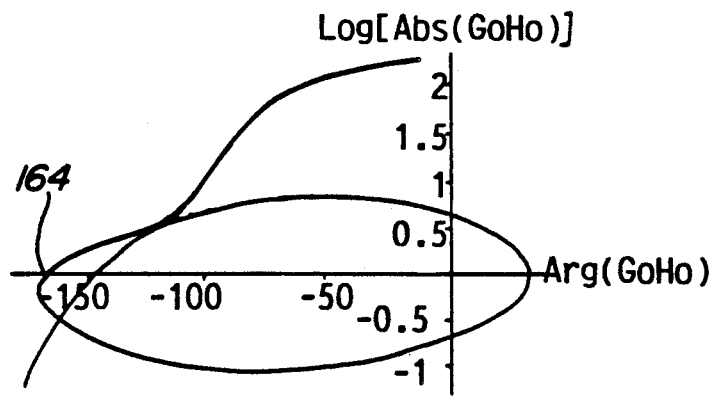
Figure 18A:
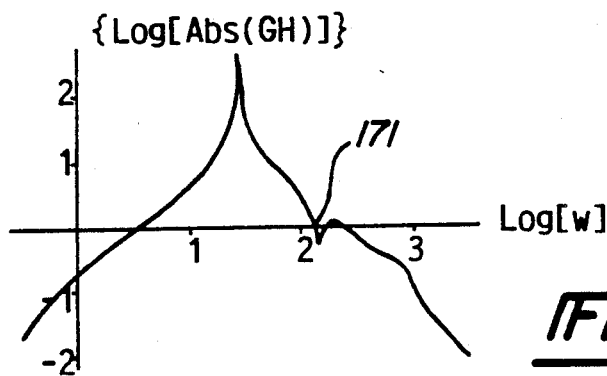
FIGS. 18A-J are graphs that depict stable dynamic performance of the rotary valve equipped power steering system utilizing a shortened value of bypass flow regulation response time according to the third embodiment of the present invention.
Figure 18B:
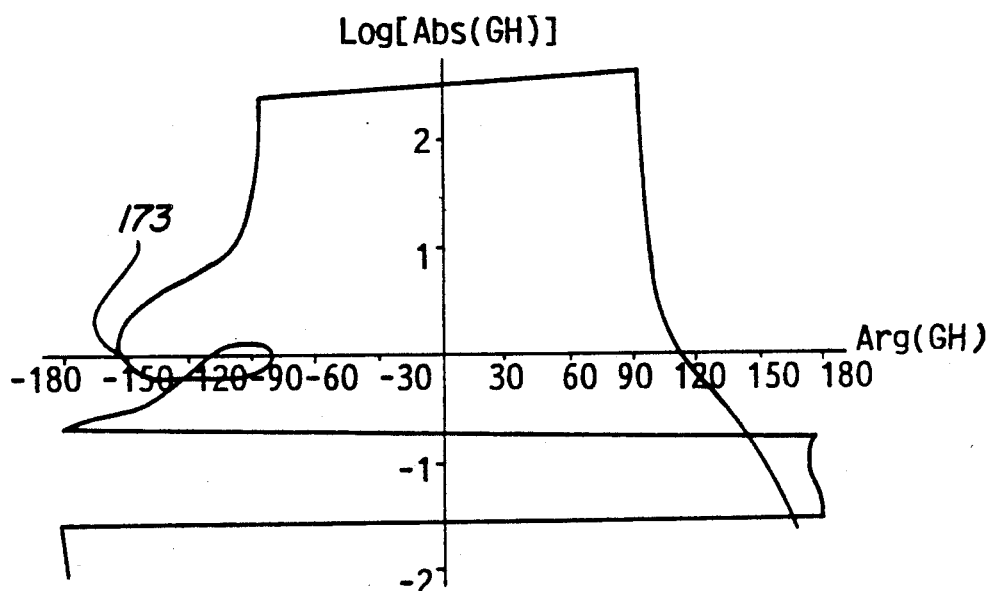
Figure 18C:
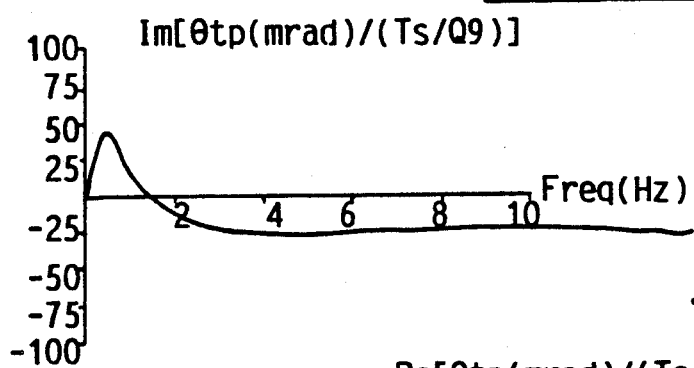
Figure 18D:
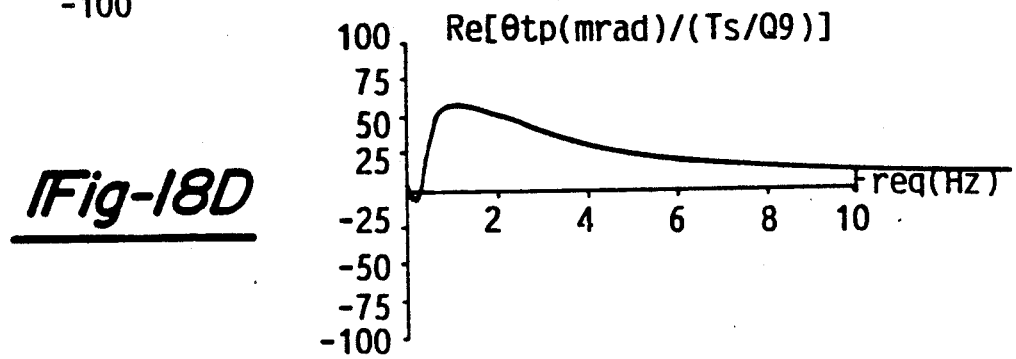
Figure 18E:
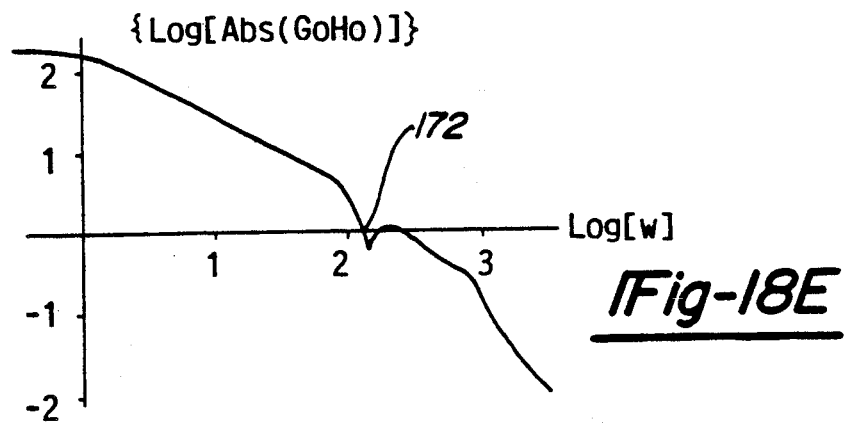
Figure 18F:
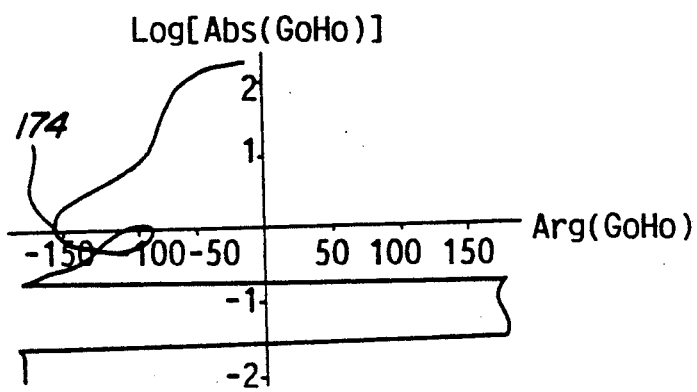
Figure 18G:
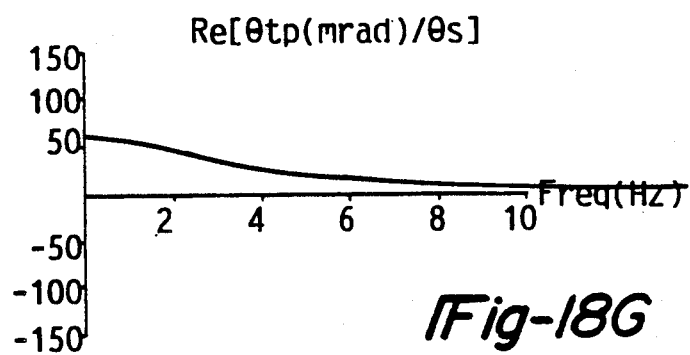
Figure 18H:
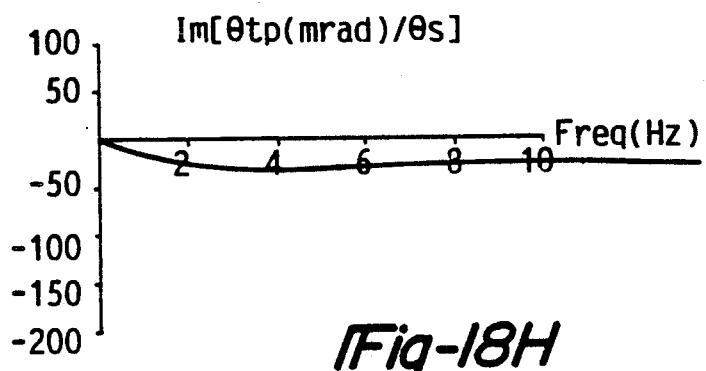
Figure 18I:
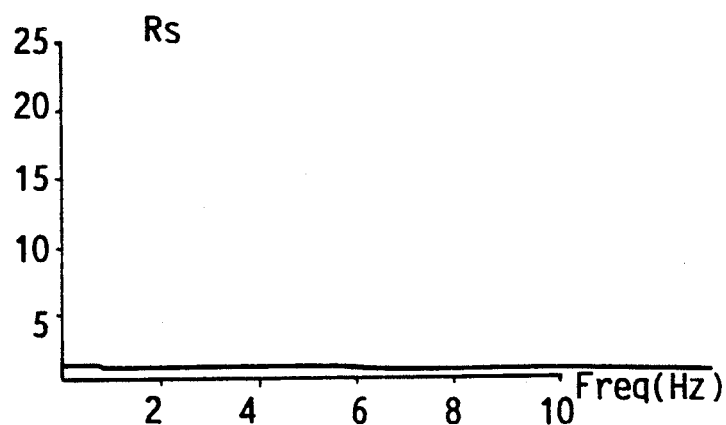
Figure 18J:
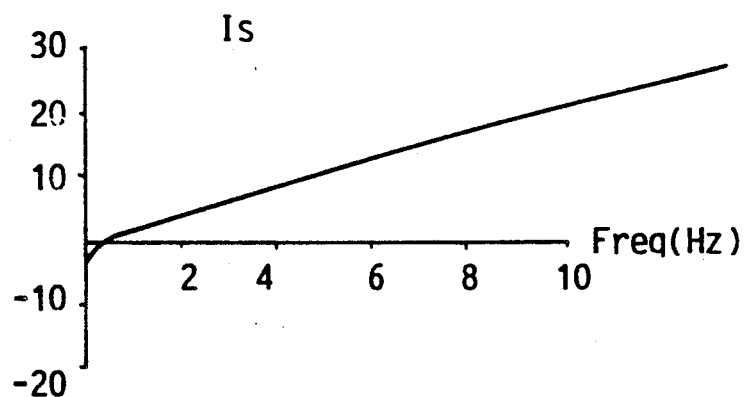

The curves 120 and 121 of FIGS. 12A depict output force $F_t$ as a function of input torque $T_s$ for the conventional rotary valve equipped power steering system of FIG. 1 and for power steering systems modified according to the teachings of the present invention, respectively. Similarly, curves 122 and 123 of FIG. 12B depict output force $F_t$ as a function of system input error angle $\theta_e$, and curves 124 and 125 of FIG. 12C depict output force $F_t$ as a function of steering wheel angle $\theta_s$, for the nominal values indicated above for conventional rotary valve equipped power steering systems (FIG. 1) and systems modified according to preferred embodiments of the present invention, respectively. It can be seen that curve 121 depicts a more gradually changing steering assistance function than that depicted by curve 120. Also, curve 123 depicts much smaller values for $\theta_e$ than curve 122, while curve 125 depicts much larger values of $\theta_s$ than curve 124. Thus, power steering systems constructed according to preferred embodiments of the present invention are seen to have a more nearly linearly applied steering assistance for eliminating a "soft backlash" characteristic common to conventional rotary valve equipped power steering systems.

The second program is used to plot dynamic system performance for a particular chosen value of thetae ($\theta_e$) which results in a value for $F_t$ of about 315 lbs. as shown in FIG. 12B above. It is defined as follows:

ke = 1.0;
thetae = ke (0.041) (* 0.01375 *);
tau = 0.050(* XX *)/ke ^ 0.5;
js = 9.32;
bs = 0.0;

-continued

```
bsc = 0.0 (* XX *);
ksc = 3200.0 (* 300.0 *);
xvm = 9.0275(* 0.0165 *);
kt = 590.0 (0.0275/xvm) ^ 2;
np = 0.333333;
a = 1.0;
rv = 0.4;
xv = rv thetae;
kv = 9346000.0 (xvm − xv) ^ 4;
ts = kt thetae;
fm = kt thetae/np;
qs = 7.0;
lv = 0.004;
lp = 0.0001;
lt = lv + lp;
qss = ((kv ^ 2 + 4 qs kv lt) ^ 0.5 − kv)/(2 lt);
fh = 9.107 10 ^ −6 qss  2 a/(xvm − xv) ^ 4;
ft = fm + fh;
xp = −Log[1 − ft/400]/1.5;
ktp = 1.0 (15000.0 E ^ (−1.5 xp));
btp = 1.9 (250 + 500 xp + 87.5 xp ^ 2);
ksw = 1.0 (25000.0);
bsw = 1.0 (100.0);
jw = 6.25;
rw = 5.0;
kr = 4000.0;
mp = 9.925;
bp = 2.0;
q1[s_]:= bsw s + ksw;
q2[s_]:= (btp + bsw) s + ktp + ksw;
q3[s_]:= jw s ^ 2 + q1[s] − q1[s] ^ 2/q2[s] + kr rw ^ 2;
q4[s_]:= mp s ^ 2 + bp s + kr;
kc = 0.000025;
pi = N[Pi, 10];
q7[s_]:= (kc + kv tau/qs) s + kv/qs + lv + lp;
q8[s_]:= js s ^ 2 + bs s + k3 kt;
q9[s_]:= js s ^ 2 + bs s;
q16[s_]:= (37384000 (.0275 − xv) ^ 3)/q7[s] ^ 2;
q17[s_]:= (bsc s + ksc)/(bsc s + ksc + kt);
go[s_]:= Block[{myq3,myq4,myq7,myq16,myq17},
    myq3 = q3[s];
    myq4 = q4[s];
    myq7 = q7[s];
    myq16 = q16[s];
    myq17 = q17[s];
    N[((myq17 kt/np + myq17 rv myq16 a)/(myq4 −
       −(kr rw)  2/myq3 + a  2 s/myq7), 10]];
ho = N[1/np, 10];
g[s_]:= Block[{myq3,myq4,myq7,myq8,myq16,myq17},
    myq3 = q3[s];
    myq4 = q4[s];
    myq7 = q7[s];
    myq8 = q8[s];
    myq16 = q16[s];
    myq17 = q17[s];
    N[((myq17 kt/np + myq17 rv myq16 a)/(myq8
       (myq4 − (kr rw)  2/myq3 + a ^ 2 s/myq7)), 10]];
h[s_]:= N[q9[s]/np, 10];
``` where (*_*) indicates alternate values used for power steering systems comprised in preferred embodiments of the present invention and (* XX *) indicates alternate values to be uniquely assigned for each example to follow.

For exemplary and comparative purposes, FIGS. 13A-J and 14A-J illustrate plots which depict the dynamic performance of conventional rotary valve equipped power steering systems of FIG. 1 having nominal (i.e., $\tau=0.050$ sec.) and increased (i.e., $\tau=0.150$ sec.) values of bypass flow regulation response time, respectively. FIGS. 13A-J and 14A-J chart Log-[Abs[GH]] as a function of Log[$\omega$]; Log[Abs[GH]] as a function of Arg[GH]; Re[$\theta_{tp}$Q9/T$_s$] and Im[$\theta_{tp}$Q9/T$_s$] as a function of frequency; Log[Abs[GoHo]] as a function of Log[$\omega$]; Log[Abs[GoHo]] as a function of Arg-[GoHo]; and Re[$\theta_{tp}/\theta_s$], Im[$\theta_{tp}/\theta_s$], R$_s$ and X$_s$ as a function of frequency (where R$_s$ and X$_s$ are real and imaginary parts, respectively, of a steering wheel input impedance function determined by T$_s$/s$\theta_s$). The system depicted in FIGS. 13A-J can be seen to be unstable. This instability is seen in that both the GH and GoHo functions achieve their first roll off unity gain cross-overs, as indicated at points 130 and 131 in FIGS. 13A and 13E, respectively, and segments 132 and 133 of curves 134 and 135, respectively, in FIGS. 13B and 13F, respectively, with lagging phase angles beyond −180 degrees. (Note, segments 132 and 133 are "wrapped around" by 360 degrees and actually depict argument values in the order of −210 degrees.) This occurs at about Log[w]=2.9 or approximately 17 Hz. (Frequency being found by the formula 10 Log[w]/2$\pi$.)

On the other hand, the dynamic system performance depicted in FIGS. 14A-J can be seen to be stable. The GH and GoHo functions are seen to have a generally lower value for Log[w] of between 1.0 and 2.0. The first roll off unity gain crossovers still occur at about Log[w]=2.0 as indicated at points 140 and 141 in FIGS. 14A and 14E, respectively, but phase angles have been reduced by about 60 degrees as shown at points 142 and 143 in FIGS. 14B and 14F, respectively, which indicate values of about −150 degrees. However, system response has degraded as shown by a dip in curve 144 shown in FIG. 14G at point 145. This dip occurs at about 5 Hz. at the high system pressure (i.e., about 250 psi as indicated by curve 122 in FIG. 12B and a piston area of 1.0 sq. in.) which results from the assumed value thetae=0.041 rad. On the other hand, values of bypass flow regulation response time typically increase concomitantly with lower values of thetae and can even exceed 1.0 sec. Such values generally are unsatisfactory since they exceed human perception time. This, in turn, often results in the driver not waiting for steering assist to develop but instead, over-correcting for random vehicle yaw motions.

In accordance with the present invention, FIGS. 15A-J are plots which depict the dynamic performance of the rotary valve equipped power steering system 50 employing shaft coupling 220 according to the first preferred embodiment. The rotary valve equipped power steering system 50 is modified with respect to conventional rotary valve equipped power steering system 50 by inclusion of shaft coupling 220.

According to SAE Technical Paper No. 880707 entitled 1988 LINCOLN CONTINENTAL VARIABLE-ASSIST POWER STEERING SYSTEM by J. J. Duffy, X$_{vm}$ can be reduced to a value of about 0.0165 rad. as indicated by (* 0.0165 *) in the second program listed above. This is concomitant with a value of $\theta_e$=0.01375 rad. for F$_t$=325 lbs. Values of $\tau$=0.050 sec., B$_{sc}$=0.0 in.lb.sec./rad. and K$_{sc}$=300 in.lb./rad. are chosen for rotary valve equipped power steering system 50 using shaft coupling 220 while K$_t$ is increased by a factory of 0.0275/X$_{vm}^2$, or to about 1640 in.lbs./rad., in order to maintain T$_s$ at about 22 in.lbs. The open loop gain functions GH and GoHo shown in FIGS. 15A and 15E, respectively, are generally reduced in value while their phase angles shown in FIGS. 15B and 15F, respectively, are generally more favorable compared to conventional systems, and have primary unity gain crossovers at lagging angles of about −140 degrees.

Stability characteristics of rotary valve equipped power steering system 50 are still dependent upon selected values for $\tau$ however. This is shown in FIGS. 16A-J wherein dynamic performance for an otherwise identical rotary valve equipped power steering system having a value of 0.025 sec. for $\tau$. The primary unity gain crossover occurs in a relatively unstable manner as indicated at points 151 and 152 in FIGS. 16B and 16F, respectively, where primary unity gain crossovers occur at lagging phase angles of about −195 degrees.

Improved stability can be realized by introducing non-zero values of $B_{sc}$ such as is implemented in rotary valve equipped power steering system 50 employing damped shaft coupling 240 according to the second preferred embodiment of the present invention. This has the effect of compensating for a pole related to $\tau$ in the open-loop response characteristics of GH and GoHo by introducing a zero into the gain curves.

FIGS. 17A-J depict the dynamic performance of a rotary valve equipped power steering system 50 with damped shaft coupling 240 wherein $B_{sc}=3.9$ in.lb.sec./rad. and $\tau=0.025$ sec.

The zero occurs at a corner frequency whereat the absolute value of $B_{sc}s$ equals the value of $K_{sc}$. Since s stands for $j\omega$, $\omega_{sc}=K_{sc}/B_{sc}=100$ rad./sec. (where $\omega_{sc}$ is the corner frequency) or about the unity gain crossover frequency as indicated by points 161 and 162 in FIGS. 17A and 17E, respectively. The net effect is to raise the primary unity gain crossover phase angle to about −160 degrees as indicated by points 163 and 164 in FIGS. 17B and 17F, respectively.

Improved stability can also be realized by significantly reducing the value of $\tau$. This has the effect of pushing the pole related to $\tau$ in the open-loop response characteristics of GH and GoHo beyond unity gain crossover thereby raising the primary unity gain crossover phase angle.

FIGS. 18A-J depict the dynamic performance of a rotary valve equipped power steering system wherein all values are the same as before except $B_{sc}=0.0$ in.lb.sec./rad. and $\tau=0.0025$ sec. Primary gain crossover now occurs at about $w=125$ rad./sec. as indicated by points 171 and 172 in FIGS. 18A and 18E, respectively, with a phase angle of about −155 degrees as indicated by points 173 and 174 in FIGS. 18B and 18F, respectively.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A power steering system for motor vehicles of the type used for steering dirigible wheels in response to a input torque applied to a steering wheel, comprising:

mechanical steering gear means for generating a mechanically derived steering force in response to said input torque;

a power cylinder coupled to said mechanical steering gear means for producing a hydraulically derived steering force for augmenting said mechanically derived steering force;

rotary control valve means in fluid communication with said power cylinder for generating the differential pressure applied to said power cylinder, said rotary control valve means having first and second valve members;

a first shaft coupled to said steering wheel;

a second shaft coupled to said first valve member;

means for coupling said second valve member of said rotary valve means to said mechanical steering gear means;

means for supplying fluid to said rotary control valve means;

first torsionally compliant means for elastically interconnecting said first and second valve members, said first torsionally compliant means having a first rotational stiffness characteristic; and coupling means for coupling said first and second shafts, said coupling means having second torsionally compliant means for generating a second rotational stiffness characteristic which is less than said first rotational stiffness characteristic.

2. The power steering system of claim 1 wherein said power steering system is a closed loop servo system wherein said second torsionally compliant means generates a generally decreased open loop gain value whereby unity gain crossover is achieved with a reduced phase lag angle.

3. The power steering system of claim 2 further comprising damping means for adding a zero function to said open loop gain value for generating a greater reduction in said phase lag angle.

4. The power steering system of claim 2 wherein said means for supplying fluid to said rotary control valve means include means for supplying a constant flow rate such that substantially instantaneous pressure response promotes unity gain crossover with a still further reduced phase lag angle.

5. The power steering system of claim 3 wherein said means for supplying fluid to said rotary control valve means include means for supplying a constant flow rate such that substantially instantaneous pressure response promotes unity gain crossover with a still further reduced phase lag angle.

6. The power steering system of claim 2 wherein said rotary control valve means is an open centered rotary valve operable to selectively control fluid flow therethrough as a function of said input torque.

7. The power steering system of claim 2 wherein said mechanical steering gear means includes an input shaft coupled to said coupling means, an actuation member generally coaxially aligned with said input shaft and wherein said first torsionally compliant means is adapted to interconnect said input shaft to said actuation member for transmitting said input torque thereto, said input torque being transferred from said actuation member to a driven member for producing said mechanically derived steering force.

8. The power steering system of claim 7 wherein each of said first and second torsionally compliant means deflect elastically in a substantially linear manner with respect to said steering wheel.

9. The power steering system of claim 6 wherein output from said rotary valve is differential right and left fluid pressure applied to opposite ends of said power cylinder for generating said hydraulically derived steering force.

10. The power steering system of claim 9 wherein said open loop gain has a value of substantially about 1.0 with an absolute value of its phase angle being less than 180 degrees.

11. The power steering system of claim 3 wherein said damping means is an elastomeric damping member adapted to provide rotational between said first and second shafts.

12. A method for improving the stability of a power steering system of the type used in motor vehicles for steering dirigible wheels, said method comprising the steps of:

applying an input torque to a rotary valve equipped power steering unit by applying a steering torque to a steering wheel coupled thereto;

applying said input torque to a first torsionally compliant member associated with said rotary valve power steering unit for generating a mechanically derived and a hydraulically derived steering force in response to said input torque to define a total steering force which is applied to said dirigible wheels;

coupling a coupling device intermediate said rotary valve power steering unit and said steering wheel, said coupling device having a second torsionally compliant member having a rotational stiffness characteristic that is less than the rotational stiffness characteristic associated with said first torsionally compliant member;

whereby said coupling device produces a reduction in the open loop gain value of said power steering system such that unity gain crossover is achieved with a reduced phase lag angle.

13. The method of claim 12 further comprising the step of providing damping means associated with said second torsionally compliant member for adding a zero function to said open loop gain such that said unity gain crossover is achieved with a further reduced phase lag angle.

14. The method of claim 12 further comprising the step of providing means for generating a constant flow rate which is delivered to said rotary equipped power steering unit at a substantially constant flow rate for generating substantially instantaneous pressure response whereby unity gain crossover occurs with a further reduced phase lag angle.

15. The method of claim 13 further comprising the step of providing means for generating a constant flow rate which is delivered to said rotary equipped power steering unit at a substantially constant flow rate for generating substantially instantaneous pressure response whereby unity gain crossover occur with a further reduced phase lag angle.

* * * * *

UNITED STATES PATENT AND TRADEMARK OFFICE
CERTIFICATE OF CORRECTION

PATENT NO. : 5,072,650 (Page 1 of 3)
DATED : December 17, 1991
INVENTOR(S) : Edward H. Phillips It is certified that error appears in the above-identified patent and that said Letters Patent is hereby corrected as shown below:

Column 3, line 36,
"；" should be --.--.

Column 5, line 27,
"$B_{tp}'250 + 500X_p + 875X_p^2$," should be --$B_{tp} = 250 + 500X_p + 87.5_p^2$,--.

Column 6, line 7,
"principle" should be --principal--.

Column 6, line 42,
after "13", insert --)--.

Column 7, line 15,
"F" should be --$F_t$--.

Column 8, line 15,
"rv - 0.4;" should be --rv = 0.4;--.

Column 8, line 26,
" 2 a/(0.0275" should be --^2 a/(0.0275--.

Column 8, line 38,
"embodiment" should be --embodiments--.

Column 9, line 43,
"Once" should be --One--.

UNITED STATES PATENT AND TRADEMARK OFFICE
CERTIFICATE OF CORRECTION

PATENT NO.  :  5,072,650              (Page 2 of 3)
DATED       :  December 17, 1991
INVENTOR(S) :  Edward H. Phillips It is certified that error appears in the above-identified patent and that said Letters Patent is hereby corrected as shown below:

Column 11, line 5,
   "kt = 590.0 (0.0275/xvm) 2;" should be
   --kt = 590.0 (0.0275/xvm) ^2;--.

Column 11, line 15,
   "-6 qss 2 a/(xvm - xv)^4;" should be -- -6 qss ^2 a/(xvm - xv)^4;--.

Column 11, line 39,
   "-(kr rw) 2/myq3 + a 2 s/myq7), 10]];" should be
   -- -(kr rw) ^2/myq3 + a ^2 s/myq7), 10]];--.

Column 11, line 47,
   "(myq4 - (kr rw) 2/myq3" should be --(myq4 - (kr rw) ^2/myq3--.

Column 12, line 13,
   "10 Log[w]/2π.)" should be --10^Log[ω]/2π.)--.

Column 12, line 56,
   "factory" should be --factor--.

Column 13, line 37,
   "w = 125" should be --ω = 125--.

Column 14, line 67, claim 11,
   after "rotational", insert --flexibility and damping--.

UNITED STATES PATENT AND TRADEMARK OFFICE
CERTIFICATE OF CORRECTION

PATENT NO. : 5,072,650 (Page 3 of 3)
DATED : December 17, 1991
INVENTOR(S) : Edward H. Phillips It is certified that error appears in the above-identified patent and that said Letters Patent is hereby corrected as shown below:

Column 16, line 21, claim 15,
"occur" should be --occurs--.

Signed and Sealed this

Twenty-fourth Day of August, 1993

Attest:

BRUCE LEHMAN

Attesting Officer   Commissioner of Patents and Trademarks